(12) United States Patent
Jo et al.

(10) Patent No.: US 12,191,576 B2
(45) Date of Patent: Jan. 7, 2025

(54) ANTENNA AND ELECTRONIC DEVICE INCLUDING SAME

(71) Applicant: Samsung Electronics Co., Ltd., Suwon-si (KR)

(72) Inventors: Jaehoon Jo, Suwon-si (KR); Hosaeng Kim, Suwon-si (KR); Seongjin Park, Suwon-si (KR); Sumin Yun, Suwon-si (KR); Woomin Jang, Suwon-si (KR); Jehun Jong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 117 days.

(21) Appl. No.: 17/899,136

(22) Filed: Aug. 30, 2022

(65) Prior Publication Data
US 2023/0062765 A1    Mar. 2, 2023

Related U.S. Application Data

(63) Continuation of application No. PCT/KR2022/011937, filed on Aug. 10, 2022.

(30) Foreign Application Priority Data

Aug. 26, 2021    (KR) ........................ 10-2021-0112933

(51) Int. Cl.
*H01Q 5/10*    (2015.01)
*H01Q 1/24*    (2006.01)
(Continued)

(52) U.S. Cl.
CPC .............. *H01Q 5/10* (2015.01); *H01Q 1/243* (2013.01); *H01Q 9/045* (2013.01); *H01Q 21/08* (2013.01); *H04M 1/026* (2013.01)

(58) Field of Classification Search
CPC ....... H01Q 9/0407; H01Q 9/0414; H01Q 1/38
See application file for complete search history.

(56) References Cited

U.S. PATENT DOCUMENTS

| 2012/0044113 A1 | 2/2012 | Satoh et al. |
| 2018/0191081 A1 | 7/2018 | Lukyanov et al. |

(Continued)

FOREIGN PATENT DOCUMENTS

| JP | 2012-044402 A | 3/2021 |
| KR | 10-2018-0078130 A | 7/2018 |

(Continued)

OTHER PUBLICATIONS

International Search Report with Written Opinion and English translation dated Nov. 25, 2022; International Application No. PCT/KR2022/011937.

(Continued)

*Primary Examiner* — David E Lotter
*Assistant Examiner* — Aladdin Abdulbaki
(74) *Attorney, Agent, or Firm* — Jefferson IP Law, LLP

(57) ABSTRACT

An electronic device is provided. The electronic device includes a housing, an antenna structure disposed in an inner space of the housing and including a substrate having a first substrate surface and a second substrate surface facing a direction opposite the first substrate surface, and configured to have a first dielectric constant, a plurality of antenna elements disposed on the substrate at a designated interval and forming a directional beam in a direction toward which the first substrate surface faces, and at least one dielectric disposed on the first substrate surface and configured to have a second dielectric constant, and a wireless communication circuit disposed in the inner space and configured to at least one of transmit or receive a wireless signal in at least one frequency band through the plurality of antenna elements.

21 Claims, 29 Drawing Sheets

(51) Int. Cl.
*H01Q 9/04* (2006.01)
*H01Q 21/08* (2006.01)
*H04M 1/02* (2006.01)

(56) References Cited

U.S. PATENT DOCUMENTS

| | | |
|---|---|---|
| 2018/0219281 A1* | 8/2018 | Sudo .................. H01Q 21/0006 |
| 2019/0020100 A1 | 1/2019 | Jong et al. |
| 2019/0103666 A1 | 4/2019 | Balasubramanian |
| 2020/0144733 A1 | 5/2020 | Chakraborty et al. |
| 2020/0259269 A1 | 8/2020 | Kim et al. |
| 2020/0266523 A1* | 8/2020 | Park ........................ H01Q 5/371 |
| 2020/0303813 A1 | 9/2020 | Morimoto et al. |
| 2020/0328530 A1 | 10/2020 | Park et al. |
| 2020/0381804 A1 | 12/2020 | Park et al. |
| 2020/0412021 A1 | 12/2020 | Chang et al. |
| 2021/0066814 A1 | 3/2021 | Kim et al. |
| 2021/0091816 A1 | 3/2021 | Noh et al. |
| 2021/0257318 A1 | 8/2021 | Han et al. |
| 2021/0313696 A1 | 10/2021 | Chang |
| 2021/0367357 A1 | 11/2021 | Jia |
| 2022/0077566 A1 | 3/2022 | Jo et al. |
| 2022/0181781 A1* | 6/2022 | Arai ........................ H01Q 13/08 |
| 2022/0376380 A1 | 11/2022 | Park et al. |

FOREIGN PATENT DOCUMENTS

| | | |
|---|---|---|
| KR | 10-2018-0089853 A | 8/2018 |
| KR | 10-2019-0007734 A | 1/2019 |
| KR | 10-2020-0115413 A | 10/2020 |
| KR | 10-2020-0132490 A | 11/2020 |
| KR | 10-2020-0136156 A | 12/2020 |
| KR | 10-2021-0028390 A | 3/2021 |
| KR | 10-2021-0034994 A | 3/2021 |
| KR | 10-2021-0101781 A | 8/2021 |
| WO | 2019/116718 A1 | 6/2019 |
| WO | 2020/124436 A1 | 6/2020 |
| WO | 2020/187119 A1 | 9/2020 |

OTHER PUBLICATIONS

Extended European Search Report dated Oct. 1, 2024; European Appln. No. 22861598.5-1201 / 4372913 PCT/KR2022011937.

* cited by examiner

ANTENNA AND ELECTRONIC DEVICE INCLUDING SAME

CROSS-REFERENCE TO RELATED APPLICATION(S)

This application is a continuation application, claiming priority under § 365(c), of an International application No. PCT/KR2022/011937 filed on Aug. 10, 2022, which is based on and claims the benefit of a Korean patent application number 10-2021-0112933, filed on Aug. 26, 2021, in the Korean Intellectual Property Office, the disclosure of which is incorporated by reference herein in its entirety.

TECHNICAL FIELD

The disclosure relates to an antenna and an electronic device including the same.

BACKGROUND ART

With the development of wireless communication technology, electronic devices (e.g., electronic devices for communication) are commonly used in daily life, and the use of content due to this tends to increase. Due to the rapid increase in the use of content, the network capacity is gradually reaching its limit, and after the commercialization of a 4th generation (4G) communication system, research has been conducted on a communication system (e.g., 5th generation (5G), pre-5G communication system, or new radio (NR)) that at least one of transmits or receives a signal using a frequency of a high-frequency (e.g., mmWave) band (e.g., 3 gigahertz (GHz) to 300 GHz bands) to meet the increasing demand for wireless data traffic.

The above information is presented as background information only to assist with an understanding of the disclosure. No determination has been made, and no assertion is made, as to whether any of the above might be applicable as prior art with regard to the disclosure.

DISCLOSURE

Technical Problem

In recent wireless communication technologies, radio signals can be transmitted or received using mmWave band (e.g., a frequency band in the range of about 3 GHz to 100 GHz), and an efficient mounting structure for overcoming high free space loss due to frequency characteristics and increasing an antenna gain, and a new antenna structure (e.g., an antenna module) corresponding thereto are being developed. The antenna structure may include an array antenna in which various numbers of antenna elements (e.g., conductive patches and/or conductive patterns) are arranged at regular intervals. These antenna elements may be arranged so that a beam pattern is formed in any one direction inside the electronic device. For example, the antenna structure may be arranged such that a beam pattern is formed toward the rear and/or side surfaces of the front face, that is, at least a portion excluding the display, in the internal space of the electronic device.

The antenna structure may include a wiring circuit (e.g., a logic unit including a wireless communication circuit) and at least one antenna element connected to the wiring circuit on one substrate. For example, in order to substantially reduce the size of the antenna structure in the same frequency band, a method of stacking insulating layers having different dielectric constants on one substrate may be used. In this method, materials capable of fabricating a multi-layered substrate are limited, and it may be difficult to bond materials having partially different dielectric constants to one substrate.

In addition, a method of separating and coupling a substrate on which the wiring structure is disposed and a dielectric including at least one antenna element may be used. In this method, since a plurality of dielectrics including a plurality of antenna elements are arranged and spaced apart from each other at a predetermined interval on the substrate, overall rigidity of the antenna structure may be reduced.

In addition, a method in which one dielectric including a plurality of antenna elements spaced apart at a designated interval is disposed on a substrate on which the wiring structure is disposed may be used. In this method, when the substrate and the dielectric having different physical properties are bonded to each other, distortion may occur so that manufacturing difficulty may be increased.

Aspects of the disclosure are to address at least the above-mentioned problems and/or disadvantages and to provide at least the advantages described below. Accordingly, an aspect of the disclosure is to provide an antenna with reinforced rigidity and an electronic device including the same.

Another aspect of the disclosure to provide an antenna that can help to slim an electronic device and an electronic device including the same as the size is relatively reduced in the same frequency band.

Another aspect of the disclosure is to provide an antenna capable of contributing to an efficient antenna arrangement structure by including at least two array antennas operating in various frequency bands on one substrate, and an electronic device including the same.

However, the problems to be solved in the disclosure are not limited to the above-mentioned problems, and may be variously expanded without departing from the spirit and scope of the disclosure.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device may include a housing, an antenna structure disposed in an inner space of the housing and including a substrate having a first substrate surface and a second substrate surface facing in a direction opposite the first substrate surface and configured to have a first dielectric constant, a plurality of antenna elements disposed on the substrate at a designated interval and configured to form a directional beam in a direction toward which the first substrate surface faces, and at least one dielectric disposed on the first surface and configured to have a second dielectric constant, and a wireless communication circuit disposed in the inner space and configured to at least one of transmit or receive a wireless signal in at least one frequency band through the plurality of antenna elements.

In accordance with another aspect of the disclosure, an electronic device is provided. The electronic device may include a housing, an antenna structure disposed in an inner space of the housing and including a substrate having a first substrate surface and a second substrate surface facing in a direction opposite the first substrate surface and configured to have a first dielectric constant, a plurality of first antenna elements disposed on the substrate at a designated interval, and a plurality of dielectrics disposed on the first surface and configured to have a second dielectric constant, and a first wireless communication circuit disposed in the inner space and configured to at least one of transmit or receive a wireless signal in at least one first frequency band through the plurality of first antenna elements.

Advantageous Effects

According to various embodiments of the disclosure, a substrate including at least one antenna element and at least one dielectric having a dielectric constant different from that of the substrate may be arranged on the substrate at a position corresponding to the at least one antenna element, thereby helping to slim the antenna structure and reinforce rigidity of the antenna structure.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
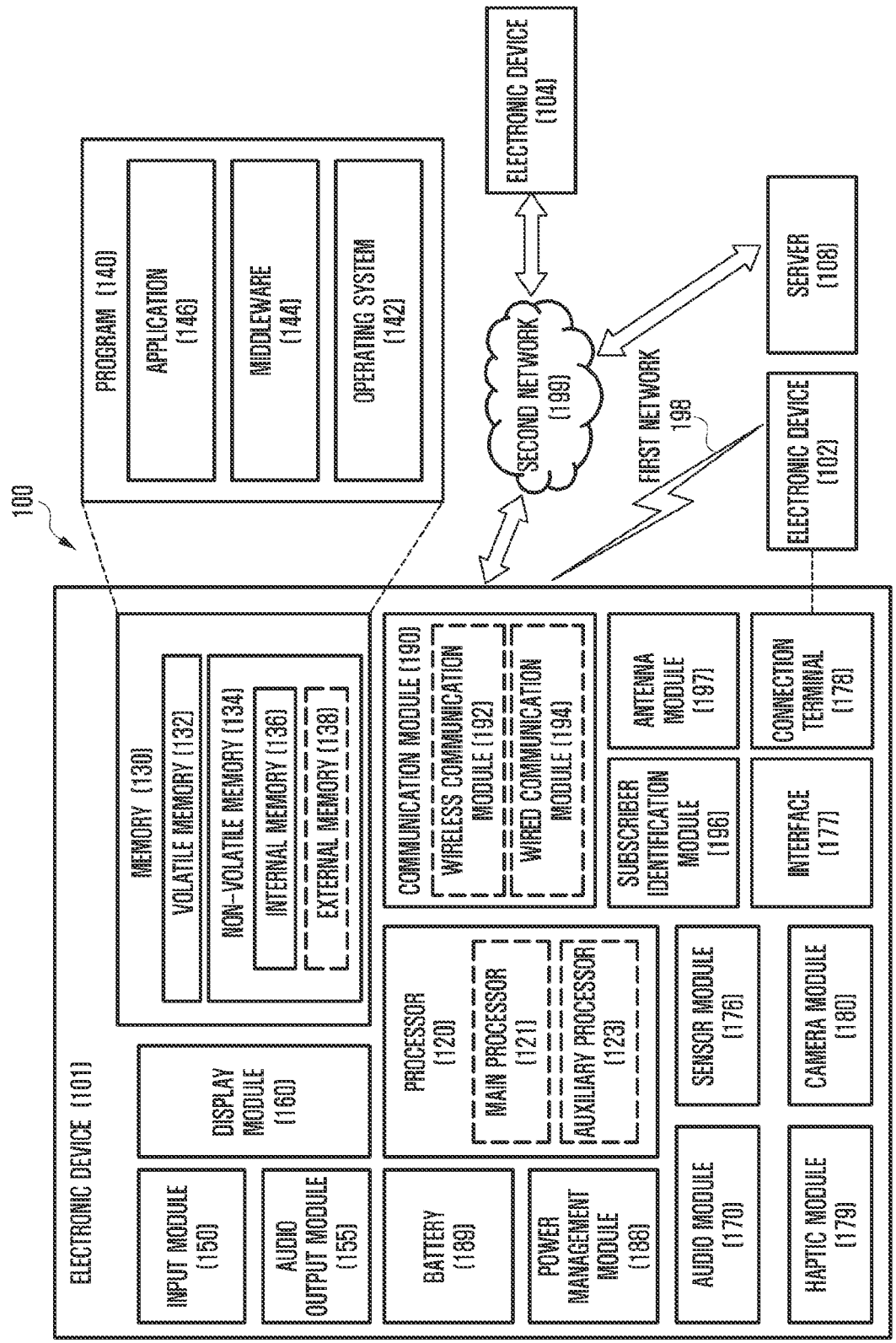
FIG. 1 is a block diagram illustrating an electronic device in a network environment according to an embodiment of the disclosure.

FIG. 1 is a block diagram illustrating an example electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input module 150, an audio output module 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. the non-volatile memory 134 may include internal memory 136 and external memory 138.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, or a digital pen (e.g., a stylus pen).

The audio output module 155 may output sound signals to the outside of the electronic device 101. The audio output module 155 may include, for example, a speaker or a receiver. The speaker may be used for general purposes, such as playing multimedia or playing record, and the receiver may be used for incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input module 150, or output the sound via the audio output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture an image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
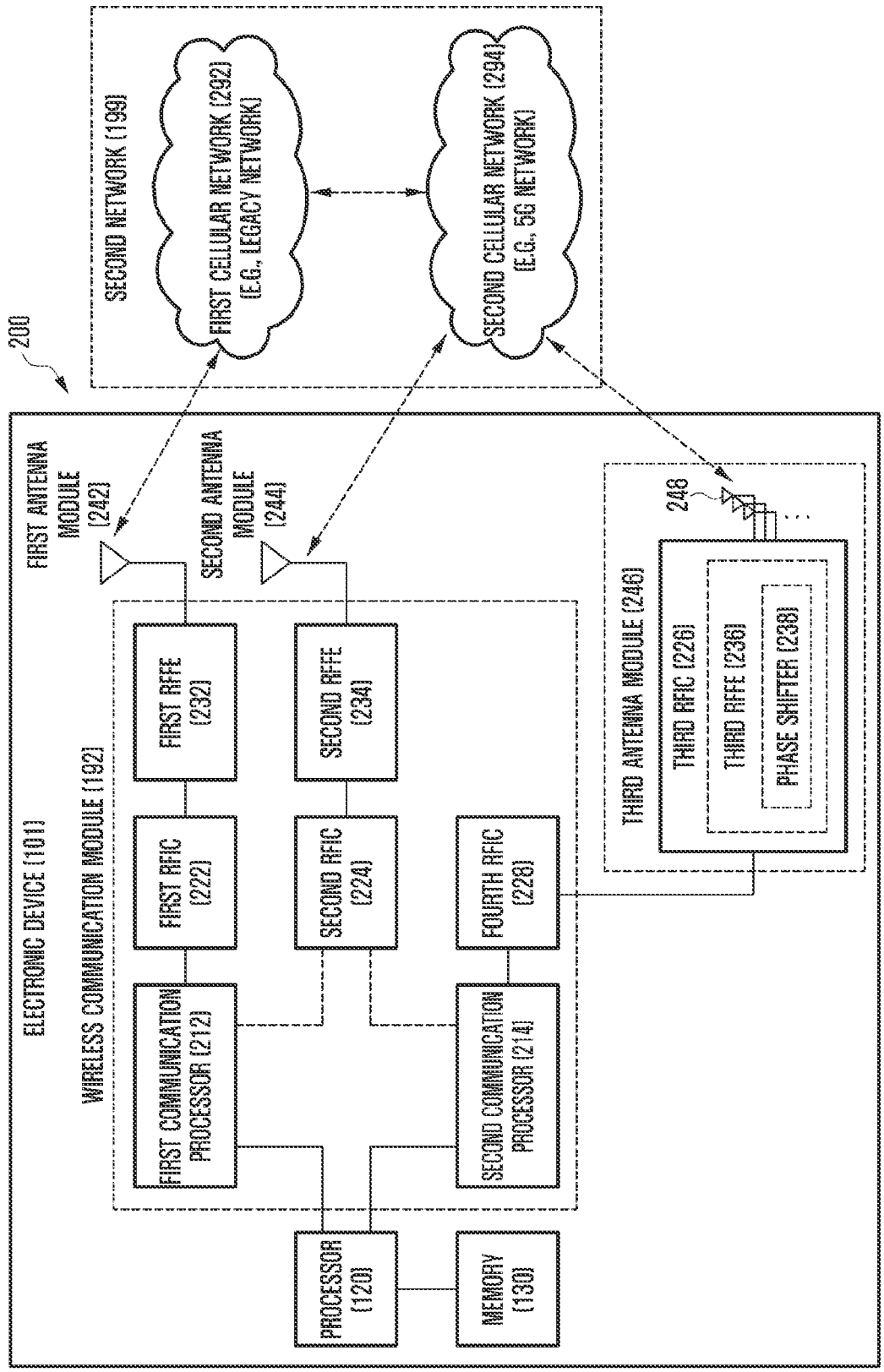
FIG. 2 is a block diagram illustrating an electronic device for supporting legacy network communication and 5G network communication according to an embodiment of the disclosure.

FIG. 2 is a block diagram illustrating an example configuration of an electronic device in a network environment including a plurality of cellular networks according to an embodiment of the disclosure.

Referring to FIG. 2, the electronic device 101 a network environment 200 may include a first communication processor (e.g., including processing circuitry) 212, second communication processor (e.g., including processing circuitry) 214, first RFIC 222, second RFIC 224, third RFIC 226, fourth RFIC 228, first radio frequency front end (RFFE) 232, second RFFE 234, first antenna module 242, second antenna module 244, and antenna 248. The electronic device 101 may include a processor 120 and a memory 130. A second network 199 may include a first cellular network 292 and a second cellular network 294. According to an embodiment, the electronic device 101 may further include at least one of the components described with reference to FIG. 1, and the second network 199 may further include at least one other network. According to an embodiment, the first communication processor 212, second communication processor 214, first RFIC 222, second RFIC 224, fourth RFIC 228, first RFFE 232, and second RFFE 234 may form at least part of the wireless communication module 192. According to an embodiment, the fourth RFIC 228 may be omitted or included as part of the third RFIC 226.

The first communication processor 212 may include various processing circuitry and establish a communication channel of a band to be used for wireless communication with the first cellular network 292 and support legacy network communication through the established communication channel. According to various embodiments, the first cellular network may be a legacy network including a second generation (2G), third generation (3G), 4G, or long term evolution (LTE) network. The second communication processor 214 may include various processing circuitry and establish a communication channel corresponding to a designated band (e.g., about 6 GHz to about 60 GHz) of bands to be used for wireless communication with the second cellular network 294, and support 5G network communication through the established communication channel. According to various embodiments, the second cellular network 294 may be a 5G network defined in third generation partnership project (3GPP). Additionally, according to an embodiment, the first communication processor 212 or the second communication processor 214 may establish a communication channel corresponding to another designated band (e.g., about 6 GHz or less) of bands to be used for wireless communication with the second cellular network 294 and support 5G network communication through the established communication channel. According to an embodiment, the first communication processor 212 and the second communication processor 214 may be implemented in a single chip or a single package. According to various embodiments, the first communication processor 212 or the second communication processor 214 may be formed in a single chip or a single package with the processor 120, the auxiliary processor 123, or the communication module 190.

Upon transmission, the first RFIC 222 may convert a baseband signal generated by the first communication processor 212 to a radio frequency (RF) signal of about 700 MHz to about 3 GHz used in the first cellular network 292 (e.g., legacy network). Upon reception, an RF signal may be obtained from the first cellular network 292 (e.g., legacy network) through an antenna (e.g., the first antenna module 242) and be preprocessed through an RFFE (e.g., the first RFFE 232). The first RFIC 222 may convert the preprocessed RF signal to a baseband signal so as to be processed by the first communication processor 212.

Upon transmission, the second RFIC 224 may convert a baseband signal generated by the first communication processor 212 or the second communication processor 214 to an RF signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding communication processor of the first communication processor 212 or the second communication processor 214.

The third RFIC 226 may convert a baseband signal generated by the second communication processor 214 to an RF signal (hereinafter, 5G Above6 RF signal) of a 5G Above6 band (e.g., about 6 GHz to about 60 GHz) to be used in the second cellular network 294 (e.g., 5G network). Upon reception, a 5G Above6 RF signal may be obtained from the second cellular network 294 (e.g., 5G network) through an antenna (e.g., the antenna 248) and be preprocessed through the third RFFE 236. The third RFIC 226 may convert the preprocessed 5G Above6 RF signal to a baseband signal so as to be processed by the second communication processor 214. According to an embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above 6RF signal. Upon reception, the 5G Above 6RF signal may be received from the second cellular network 294 (e.g., a 5G network) through an antenna (e.g., the antenna 248) and be converted to an IF signal by the third RFIC 226. The fourth RFIC 228 may convert an IF signal to a baseband signal so as to be processed by the second communication processor 214.

According to an embodiment, the first RFIC 222 and the second RFIC 224 may be implemented into at least part of a single package or a single chip. According to an embodiment, the first RFFE 232 and the second RFFE 234 may be implemented into at least part of a single package or a single chip. According to an embodiment, at least one of the first antenna module 242 or the second antenna module 244 may be omitted or may be combined with another antenna module to process RF signals of a corresponding plurality of bands.

According to an embodiment, the third RFIC 226 and the antenna 248 may be disposed at the same substrate to form a third antenna module 246. For example, the wireless communication module 192 or the processor 120 may be disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof; thus, the third antenna module 246 may be formed. By disposing the third RFIC 226 and the antenna 248 in the same substrate, a length of a transmission line therebetween can be reduced. This may reduce, for example, a loss (e.g., attenuation) of a signal of a high frequency band (e.g., about 6 GHz to about 60 GHz) to be used in 5G network communication by a transmission line. Therefore, the electronic device 101 may improve a quality or speed of communication with the second cellular network 294 (e.g., 5G network).

According to an embodiment, the antenna 248 may be formed in an antenna array including a plurality of antenna elements that may be used for beamforming. In this case, the third RFIC 226 may include a plurality of phase shifters 238 corresponding to a plurality of antenna elements, for example, as part of the third RFFE 236. Upon transmission, each of the plurality of phase shifters 238 may convert a phase of a 5G Above6 RF signal to be transmitted to the outside (e.g., a base station of a 5G network) of the electronic device 101 through a corresponding antenna element. Upon reception, each of the plurality of phase shifters 238 may convert a phase of the 5G Above6 RF signal received from the outside to the same phase or substantially the same phase through a corresponding antenna element. This enables transmission or reception through beamforming between the electronic device 101 and the outside.

The second cellular network 294 (e.g., 5G network) may operate (e.g., stand-alone (SA)) independently of the first cellular network 292 (e.g., legacy network) or may be operated (e.g., non-stand alone (NSA)) in connection with the first cellular network 292. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first communication processor 212, or the second communication processor 214).

Figure 3A:
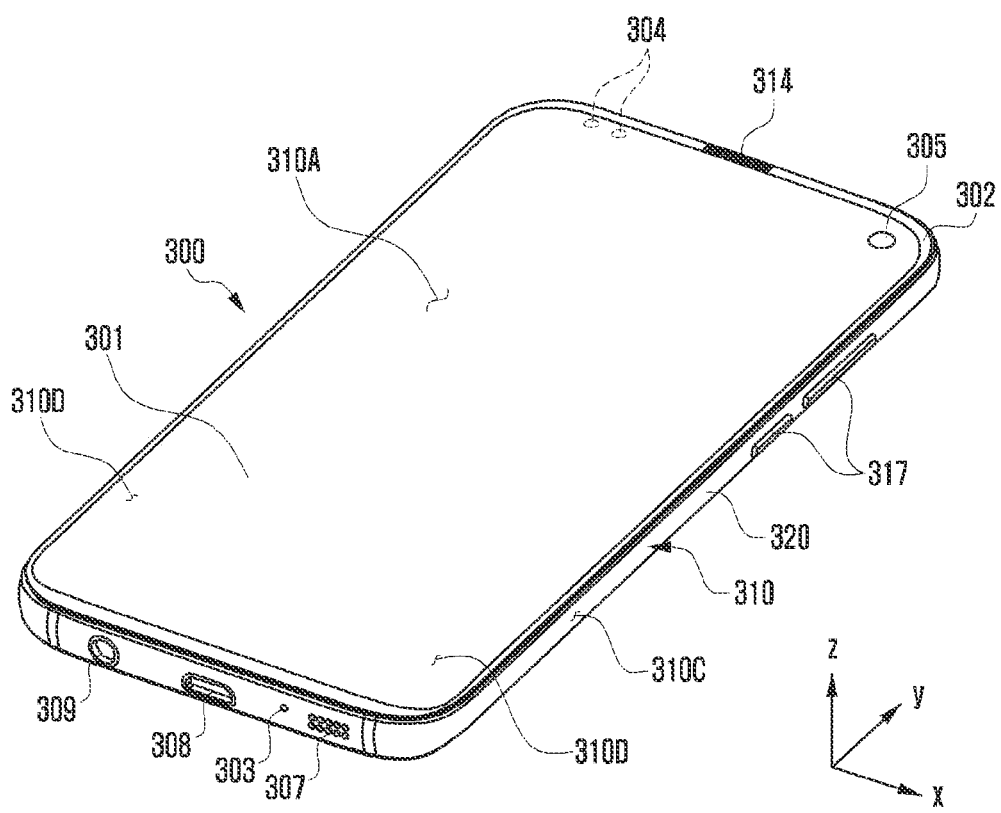
FIG. 3A is a perspective view illustrating a mobile electronic device according to an embodiment of the disclosure.
Figure 3B:
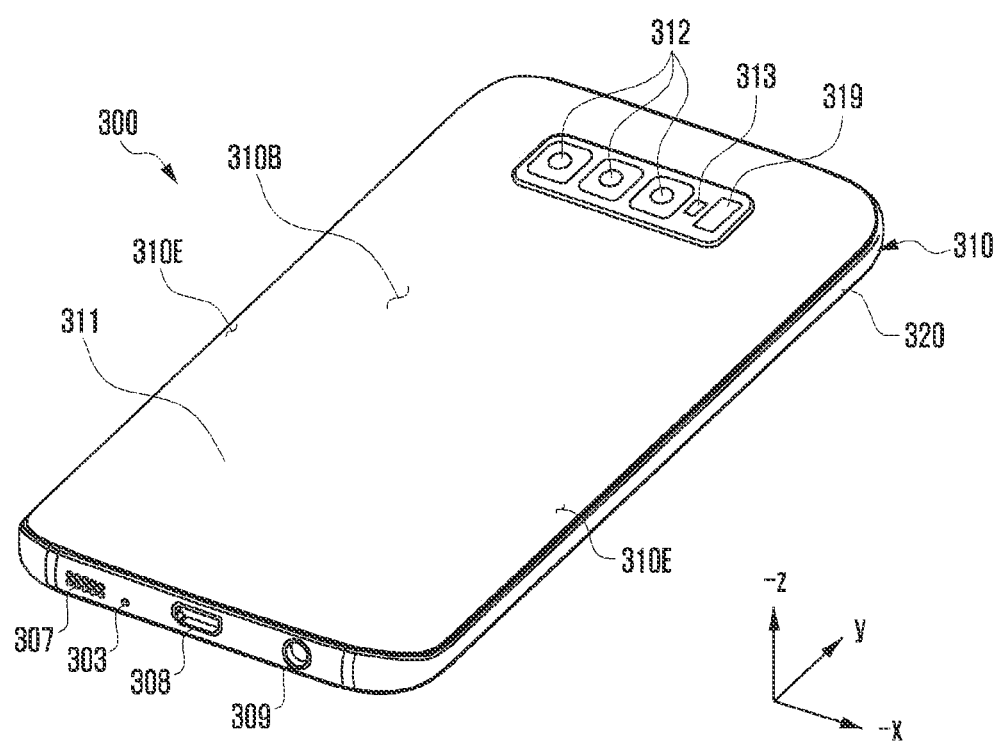
FIG. 3B is a rear perspective view illustrating a mobile electronic device according to an embodiment of the disclosure.

FIG. 3A is a front perspective view of a mobile electronic device according to an embodiment of the disclosure, and FIG. 3B is a rear perspective view of the mobile electronic device shown in FIG. 3A according to an embodiment of the disclosure.

The electronic device 300 in FIGS. 3A and 3B may be at least partially similar to the electronic device 101 in FIG. 1 or may further include various embodiments.

Referring to FIGS. 3A and 3B, a mobile electronic device 300 may include a housing 310 that includes a first surface (or front surface) 310A, a second surface (or rear surface) 310B, and a lateral surface 310C that surrounds a space between the first surface 310A and the second surface 310B. The housing 310 may refer to a structure that forms a part of the first surface 310A, the second surface 310B, and the lateral surface 310C. The first surface 310A may be formed of a front plate 302 (e.g., a glass plate or polymer plate coated with a variety of coating layers) at least a part of which is substantially transparent. The second surface 310B may be formed of a rear plate 311 which is substantially opaque. The rear plate 311 may be formed of, for example, coated or colored glass, ceramic, polymer, metal (e.g., aluminum, stainless steel (STS), or magnesium), or any combination thereof. The lateral surface 310C may be formed of a lateral bezel structure (or "lateral member") 318 which is combined with the front plate 302 and the rear plate 311 and includes a metal and/or polymer. The rear plate 311 and the lateral bezel structure 318 may be integrally formed and may be of the same material (e.g., a metallic material such as aluminum).

The front plate 302 may include two first regions 310D disposed at long edges thereof, respectively, and bent and extended seamlessly from the first surface 310A toward the rear plate 311. Similarly, the rear plate 311 may include two second regions 310E disposed at long edges thereof, respectively, and bent and extended seamlessly from the second surface 310B toward the front plate 302. The front plate 302 (or the rear plate 311) may include only one of the first regions 310D (or of the second regions 310E). The first regions 310D or the second regions 310E may be omitted in part. When viewed from a lateral side of the mobile electronic device 300, the lateral bezel structure 318 may have a first thickness (or width) on a lateral side where the first region 310D or the second region 310E is not included, and may have a second thickness, being less than the first thickness, on another lateral side where the first region 310D or the second region 310E is included.

The mobile electronic device 300 may include at least one of a display 301, audio modules 303, 307 and 314, sensor modules 304 and 319, camera modules 305, 312 and 313, a key input device 317, a light emitting device, and connector holes 308 and 309. The mobile electronic device 300 may omit at least one (e.g., the key input device 317 or the light emitting device) of the above components, or may further include other components.

The display 301 may be visible through a substantial portion of the front plate 302, for example. At least a part of the display 301 may be visible through the front plate 302 that forms the first surface 310A and the first region 310D of the lateral surface 310C. Outlines (i.e., edges and corners) of the display 301 may have substantially the same form as those of the front plate 302. The spacing between the outline of the display 301 and the outline of the front plate 302 may be substantially unchanged in order to enlarge the visible area of the display 301.

The audio modules 303, 307 and 314 may correspond to a microphone hole 303 and speaker holes 307 and 314, respectively. The microphone hole 303 may contain a microphone disposed therein for acquiring external sounds and, in a case, contain a plurality of microphones to sense a sound direction. The speaker holes 307 and 314 may be classified into an external speaker hole 307 and a call receiver hole 314. The microphone hole 303 and the speaker holes 307 and 314 may be implemented as a single hole, or a speaker (e.g., a piezo speaker) may be provided without the speaker holes 307 and 314.

The sensor modules 304 and 319 may generate electrical signals or data corresponding to an internal operating state of the mobile electronic device 300 or to an external environmental condition. The sensor modules 304 and 319 may include a first sensor module 304 (e.g., a proximity sensor) and/or a second sensor module (e.g., a fingerprint sensor) disposed on the first surface 310A of the housing 310, and/or a third sensor module 319 (e.g., a heart rate monitor (HRM) sensor) and/or a fourth sensor module (e.g., a fingerprint sensor) disposed on the second surface 310B of the housing 310. The fingerprint sensor may be disposed on the second surface 310B as well as the first surface 310A (e.g., the display 301) of the housing 310. The electronic device 300 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 305, 312 and 313 may include a first camera device 305 disposed on the first surface 310A of the electronic device 300, and a second camera module 312 and/or a flash 313 disposed on the second surface 310B. The camera module 305 or the camera module 312 may include one or more lenses, an image sensor, and/or an image signal processor. The flash 313 may include, for example, a light emitting diode or a xenon lamp. Two or more lenses (infrared cameras, wide angle and telephoto lenses) and image sensors may be disposed on one side of the electronic device 300.

The key input device 317 may be disposed on the lateral surface 310C of the housing 310. The mobile electronic device 300 may not include some or all of the key input device 317 described above, and the key input device 317 which is not included may be implemented in another form such as a soft key on the display 301. The key input device 317 may include the sensor module disposed on the second surface 310B of the housing 310.

The light emitting device may be disposed on the first surface 310A of the housing 310. For example, the light emitting device may provide status information of the electronic device 300 in an optical form. The light emitting device may provide a light source associated with the operation of the camera module 305. The light emitting device may include, for example, a light emitting diode (LED), an IR LED, or a xenon lamp.

The connector holes 308 and 309 may include a first connector hole 308 adapted for a connector (e.g., a universal serial bus (USB) connector) for transmitting and receiving power and/or data to and from an external electronic device, and/or a second connector hole 309 adapted for a connector (e.g., an earphone jack) for transmitting and receiving an audio signal to and from an external electronic device.

Some modules 305 of camera modules 305 and 312, some sensor modules 304 of sensor modules 304 and 319, or an indicator may be arranged to be exposed through a display 301. For example, the camera module 305, the sensor module 304, or the indicator may be arranged in the internal space of an electronic device 300 so as to be brought into contact with an external environment through an opening of the display 301, which is perforated up to a front plate 302. In an embodiment, some sensor modules 304 may be arranged to perform their functions without being visually exposed through the front plate 302 in the internal space of the electronic device. For example, in this case, an area of the display 301 facing the sensor module may not require a perforated opening.

Figure 3C:
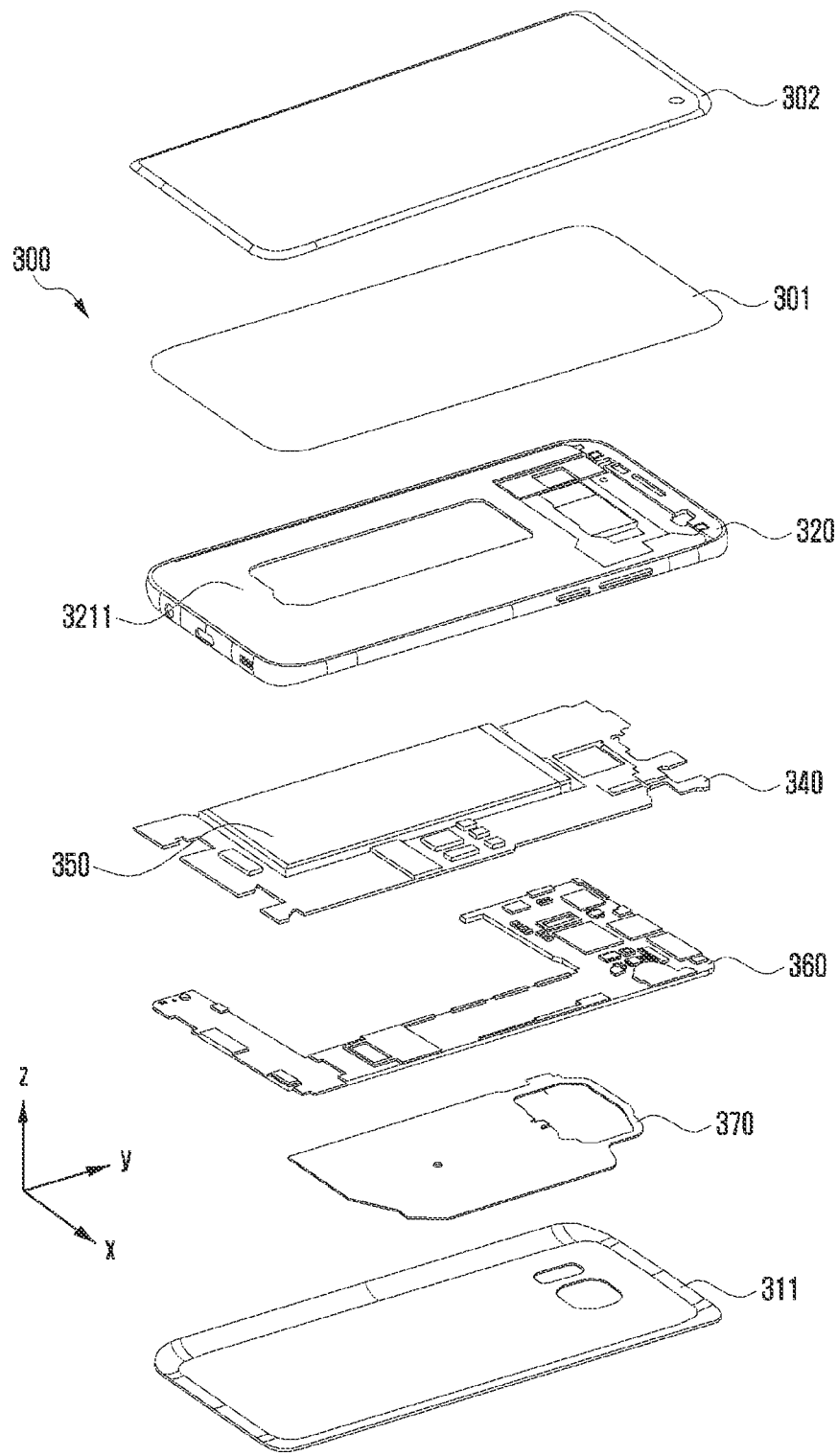
FIG. 3C is an exploded perspective view illustrating a mobile electronic device according to an embodiment of the disclosure.

FIG. 3C is an exploded perspective view illustrating the mobile electronic device shown in FIG. 3A according to an embodiment of the disclosure.

Referring to FIG. 3C a mobile electronic device 300 may include a lateral bezel structure 320, a first support member 3211 (e.g., a bracket), a front plate 302, a display 301, an electromagnetic induction panel (not shown), a printed circuit board (PCB) 340, a battery 350, a second support member 360 (e.g., a rear case), an antenna 370, and a rear plate 311. The mobile electronic device 300 may omit at least one (e.g., the first support member 3211 or the second support member 360) of the above components or may further include another component. Some components of the electronic device 300 may be the same as or similar to those of the mobile electronic device 101 shown in FIG. 3A or FIG. 3B, thus, descriptions thereof are omitted below.

The first support member 3211 is disposed inside the mobile electronic device 300 and may be connected to, or integrated with, the lateral bezel structure 320. The first support member 3211 may be formed of, for example, a metallic material and/or a non-metal (e.g., polymer) material. The first support member 3211 may be combined with the display 301 at one side thereof and also combined with the printed circuit board (PCB) 340 at the other side thereof. On the PCB 340, a processor, a memory, and/or an interface may be mounted. The processor may include, for example, one or more of a central processing unit (CPU), an application processor (AP), a graphics processing unit (GPU), an image signal processor (ISP), a sensor hub processor, or a communications processor (CP).

The memory may include, for example, one or more of a volatile memory and a non-volatile memory.

The interface may include, for example, a high definition multimedia interface (HDMI), a USB interface, a secure digital (SD) card interface, and/or an audio interface. The interface may electrically or physically connect the mobile electronic device 300 with an external electronic device and may include a USB connector, an SD card/multimedia card (MMC) connector, or an audio connector.

The battery 350 is a device for supplying power to at least one component of the mobile electronic device 300, and may include, for example, a non-rechargeable primary battery, a rechargeable secondary battery, or a fuel cell. At least a part of the battery 350 may be disposed on substantially the same plane as the PCB 340. The battery 350 may be integrally disposed within the mobile electronic device 300, and may be detachably disposed from the mobile electronic device 300.

The antenna 370 may be disposed between the rear plate 311 and the battery 350. The antenna 370 may include, for example, a near field communication (NFC) antenna, a wireless charging antenna, and/or a magnetic secure transmission (MST) antenna. The antenna 370 may perform short-range communication with an external device, or transmit and receive power required for charging wirelessly. An antenna structure may be formed by a part or combination of the lateral bezel structure 320 and/or the first support member 3211.

Figure 4A:
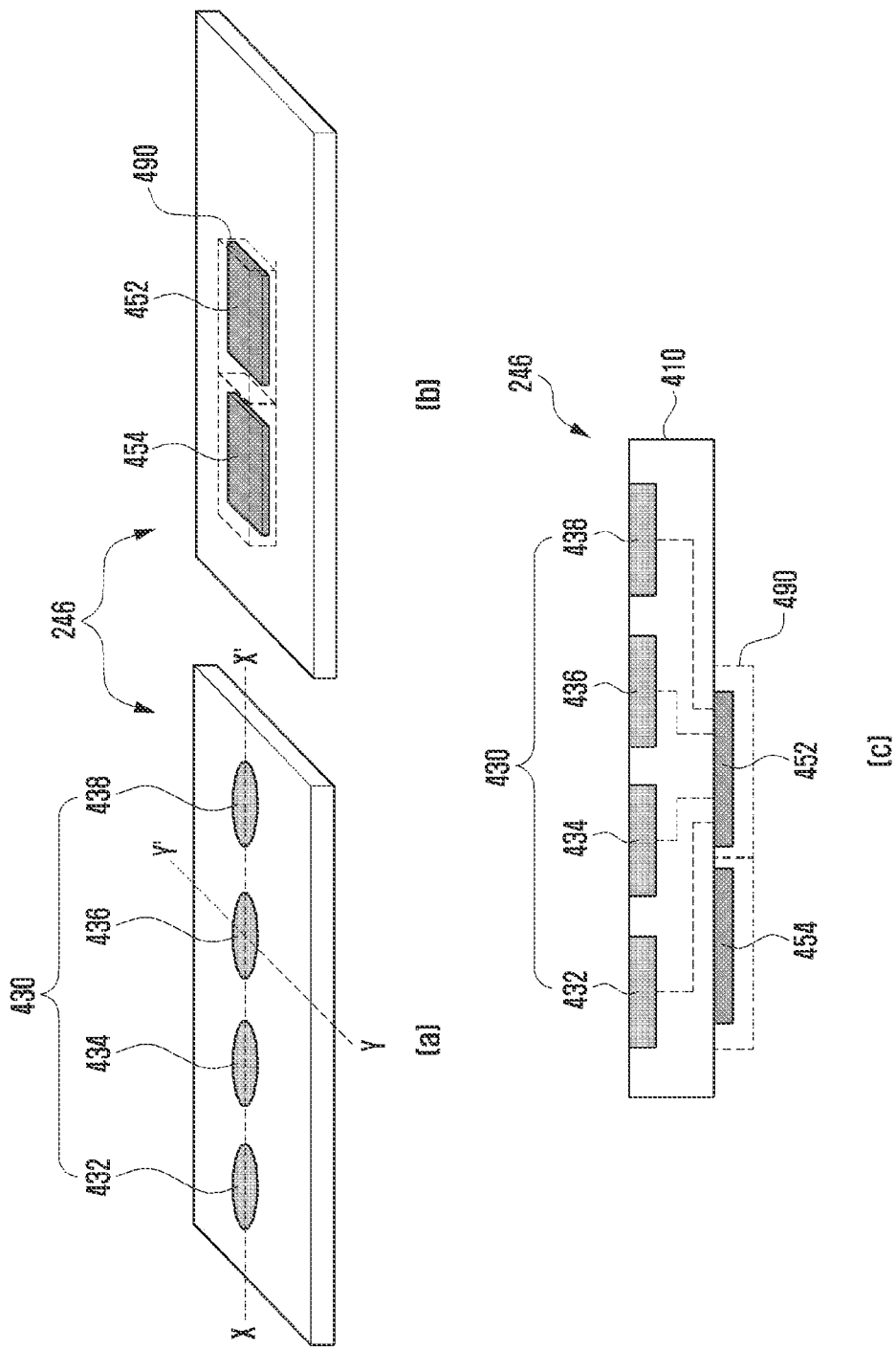
FIG. 4A illustrates an embodiment of a structure of a third antenna module described with reference to FIG. 2 according to an embodiment of the disclosure.

FIG. 4A is a diagram illustrating an example structure of, for example, a third antenna module described with reference to FIG. 2 according to an embodiment of the disclosure. Part (a) of FIG. 4A is a perspective view illustrating the third antenna module 246 viewed from one side, and part (b) of FIG. 4A is a perspective view illustrating the third antenna module 246 viewed from the other side. Part (c) of FIG. 4A is a cross-sectional view illustrating the third antenna module 246 taken along line X-X' of FIG. 4A.

With reference to FIG. 4A, in an embodiment, the third antenna module 246 may include a printed circuit board 410, an antenna array 430, a RFIC 452, and a PMIC 454. The third antenna module 246 may further include a shield member 490. In various embodiments, at least one of the above-described components may be omitted or at least two of the components may be integrally formed.

The printed circuit board 410 may include a plurality of conductive layers and a plurality of non-conductive layers stacked alternately with the conductive layers. The printed circuit board 410 may provide electrical connections between the printed circuit board 410 and/or various electronic components disposed outside using wirings and conductive vias formed in the conductive layer.

The antenna array 430 (e.g., 248 of FIG. 2) may include a plurality of antenna elements 432, 434, 436, or 438 disposed to form a directional beam. As illustrated, the antenna elements 432, 434, 436, or 438 may be formed at a first surface of the printed circuit board 410. According to an embodiment, the antenna array 430 may be formed inside the printed circuit board 410. According to the embodiment, the antenna array 430 may include the same or a different shape or kind of a plurality of antenna arrays (e.g., dipole antenna array and/or patch antenna array).

The RFIC 452 (e.g., the third RFIC 226 of FIG. 2) may be disposed at another area (e.g., a second surface opposite to the first surface) of the printed circuit board 410 spaced apart from the antenna array. The RFIC 452 is configured to process signals of a selected frequency band transmitted/received through the antenna array 430. According to an embodiment, upon transmission, the RFIC 452 may convert a baseband signal obtained from a communication processor (not shown) to an RF signal of a designated band. Upon reception, the RFIC 452 may convert an RF signal received through the antenna array 430 to a baseband signal and transfer the baseband signal to the communication processor.

According to an embodiment, upon transmission, the RFIC 452 may up-convert an IF signal (e.g., about 9 GHz to about 11 GHz) obtained from an intermediate frequency integrate circuit (IFIC) (e.g., 228 of FIG. 2) to an RF signal of a selected band. Upon reception, the RFIC 452 may down-convert the RF signal obtained through the antenna array 430, convert the RF signal to an IF signal, and transfer the IF signal to the IFIC.

The PMIC 454 may be disposed in another partial area (e.g., the second surface) of the printed circuit board 410 spaced apart from the antenna array 430. The PMIC 454 may receive a voltage from a main PCB (not illustrated) to provide power necessary for various components (e.g., the RFIC 452) on the antenna module.

The shielding member 490 may be disposed at a portion (e.g., the second surface) of the printed circuit board 410 so as to electromagnetically shield at least one of the RFIC 452 or the PMIC 454. According to an embodiment, the shield member 490 may include a shield can.

Although not shown, in various embodiments, the third antenna module 246 may be electrically connected to another printed circuit board (e.g., main circuit board) through a module interface. The module interface may include a connecting member, for example, a coaxial cable connector, board to board connector, interposer, or flexible printed circuit board (FPCB). The RFIC 452 and/or the PMIC 454 of the antenna module may be electrically connected to the printed circuit board through the connection member.

Figure 4B:
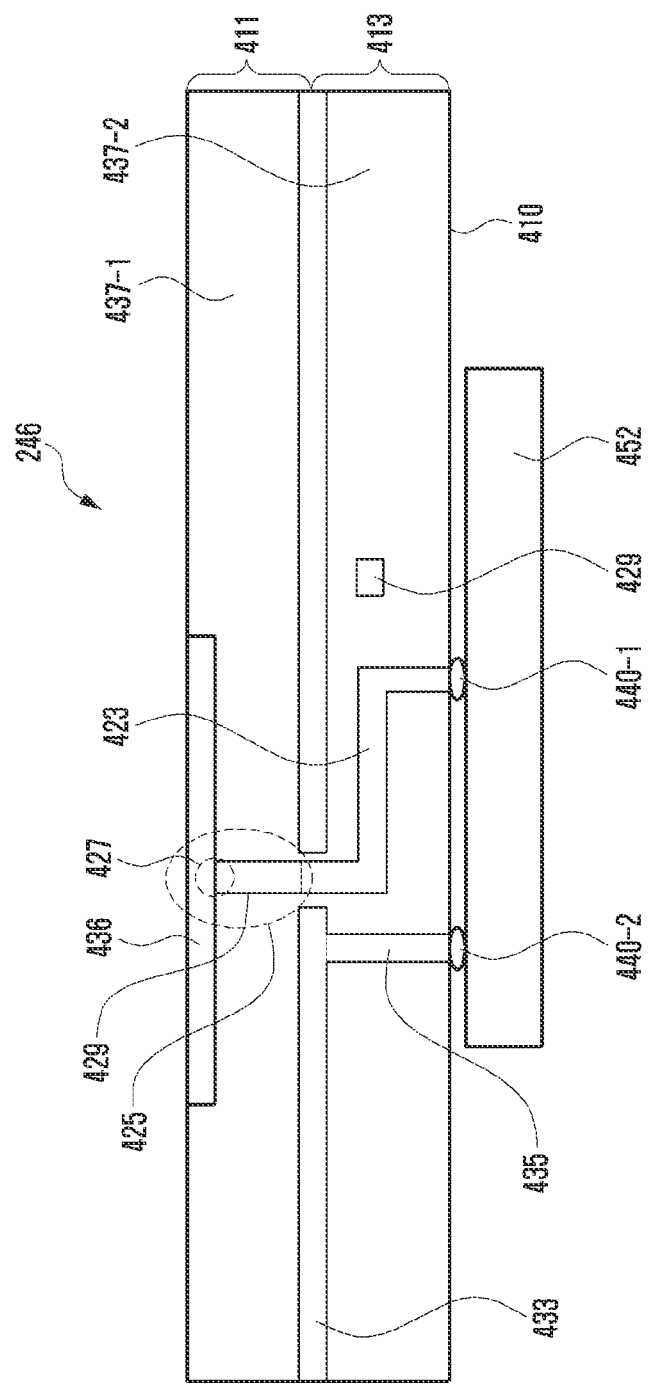
FIG. 4B is a cross-sectional view taken along line Y-Y' of the third antenna module shown in (a) of FIG. 4A according to an embodiment of the disclosure.

FIG. 4B is a cross-sectional view illustrating the third antenna module 246 taken along line Y-Y' of part (a) of FIG. 4A according to an embodiment of the disclosure. The printed circuit board 410 of the illustrated embodiment may include an antenna layer 411 and a network layer 413.

Referring to FIG. 4B, the antenna layer 411 may include at least one dielectric layer 437-1, and an antenna element 436 and/or a power feeding portion 425 formed on or inside an outer surface of a dielectric layer. The power feeding portion 425 may include a power feeding point 427 and/or a power feeding line 429.

The network layer 413 may include at least one dielectric layer 437-2, at least one ground layer 433, at least one conductive via 435, a transmission line 423, and/or a power feeding line 429 formed on or inside an outer surface of the dielectric layer.

Further, in the illustrated embodiment, the RFIC 452 (e.g., the third RFIC 226 of FIG. 2) of part (c) of FIG. 4A may be electrically connected to the network layer 413 through, for example, first and second solder bumps 440-1 and 440-2. In various embodiments, various connection structures (e.g., solder or ball grid array (BGA)) instead of the solder bumps may be used. The RFIC 452 may be electrically connected to the antenna element 436 through the first solder bump 440-1, the transmission line 423, and the power feeding portion 425. The RFIC 452 may also be electrically connected to the ground layer 433 through the second solder bump 440-2 and the conductive via 435. Although not illustrated, the RFIC 452 may also be electrically connected to the above-described module interface through the power feeding line 429.

Figure 5A:
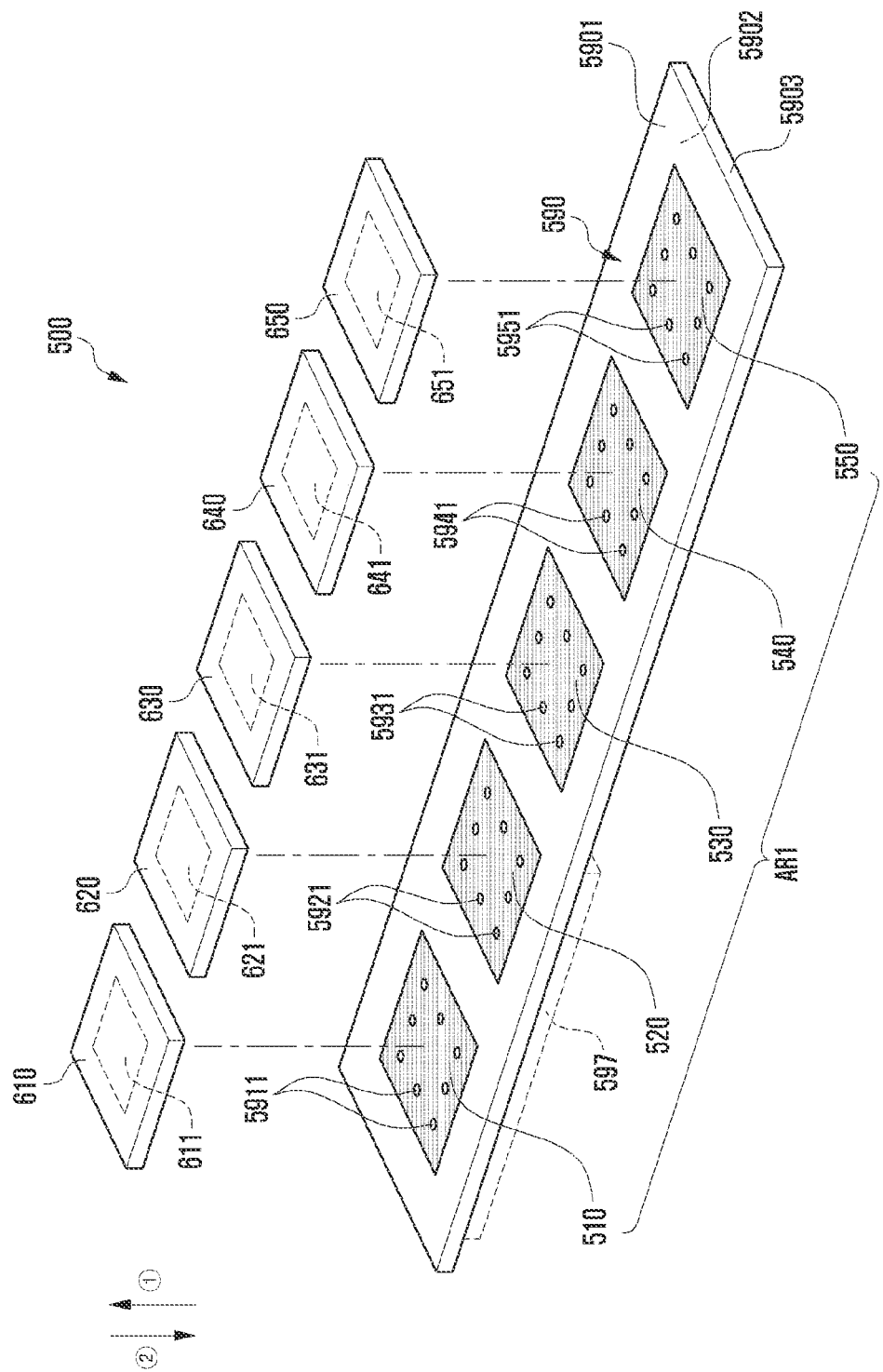
FIG. 5A is an exploded perspective view illustrating an antenna structure according to an embodiment of the disclosure.
Figure 5B:
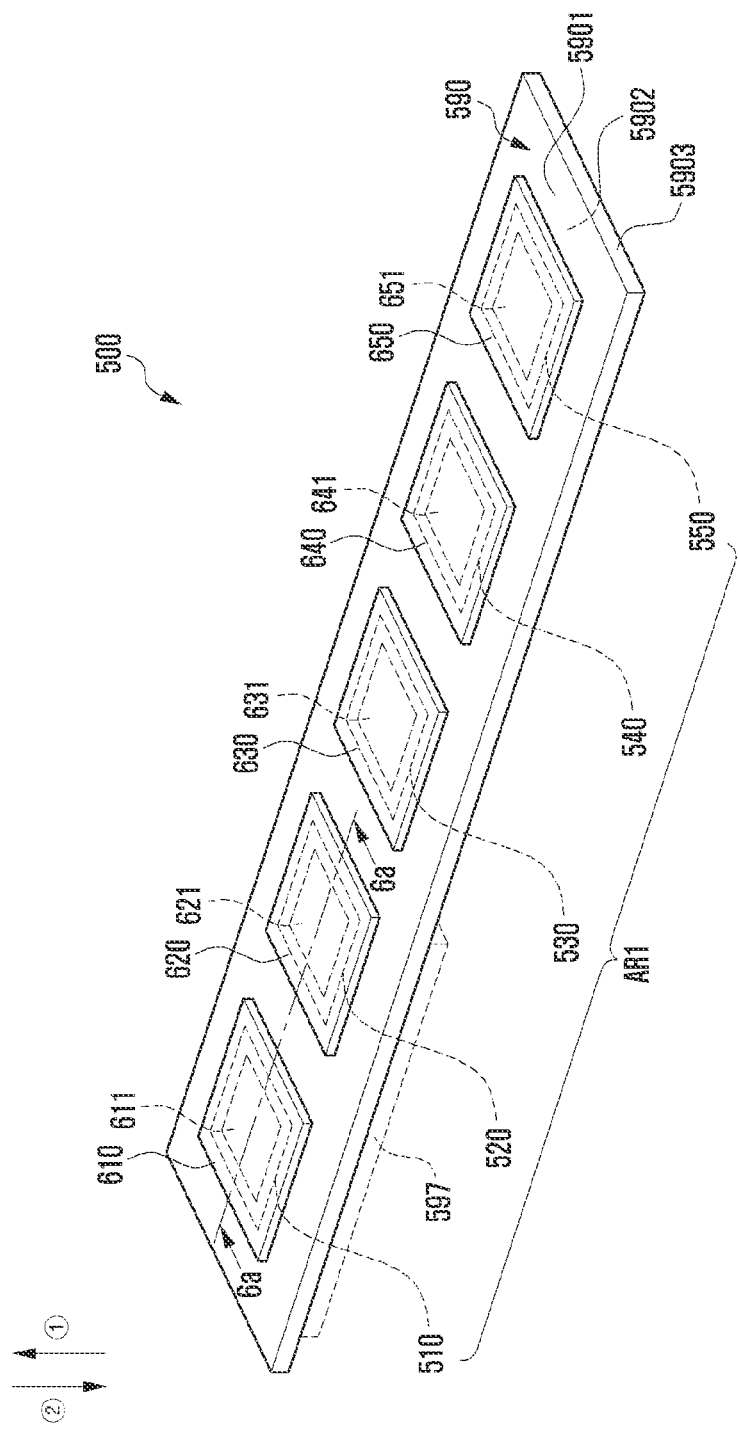
FIG. 5B is a combined perspective view illustrating an antenna structure according to an embodiment of the disclosure.
Figure 5C:
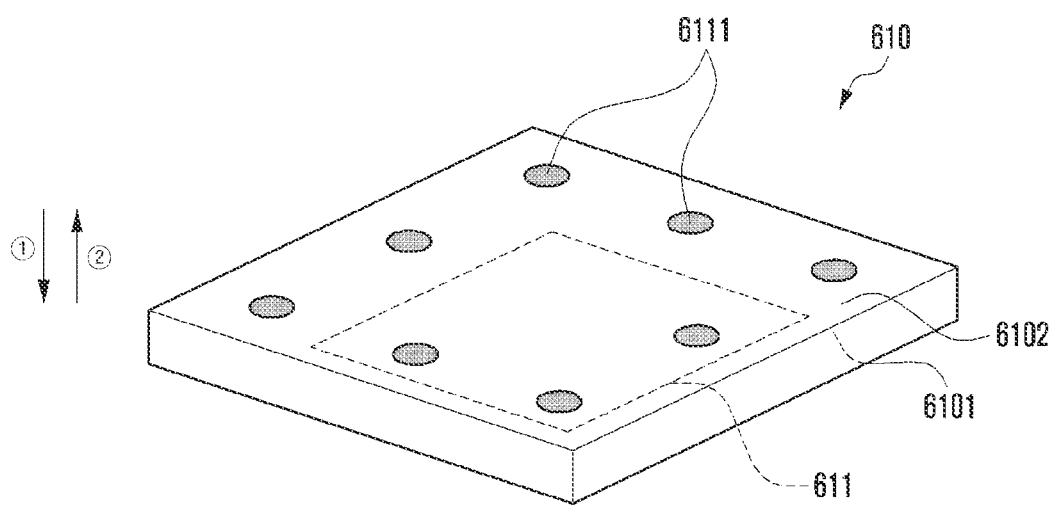
FIG. 5C is a perspective view illustrating a rear surface of a first dielectric according to an embodiment of the disclosure.

FIG. 5A is an exploded perspective view illustrating an antenna structure according to an embodiment of the disclosure. FIG. 5B is a combined perspective view illustrating an antenna structure according to an embodiment of the disclosure. FIG. 5C is a perspective view illustrating a rear surface of a first dielectric according to an embodiment of the disclosure.

An antenna structure 500 of FIGS. 5A and 5B may be at least partially similar to the third antenna module 246 of FIG. 2, or may further include other embodiments of the antenna structure.

Referring to FIGS. 5A to 5C, the antenna structure 500 (e.g., an antenna module) may include a substrate 590 (e.g., a printed circuit board) including an array antenna AR1, and a plurality of dielectrics 610, 620, 630, 640, and 650 arranged on the substrate 590. According to an embodiment, the array antenna AR1 may include a plurality of antenna elements 510, 520, 530, 540, and 550 arranged on the substrate 590 at a predetermined interval. According to an embodiment, the plurality of antenna elements 510, 520, 530, 540, and 550 may include a plurality of conductive patches and/or a plurality of conductive patterns. According to an embodiment, the substrate 590 may include a first substrate surface 5901 facing a first direction (direction ①), a second substrate surface 5902 facing a second direction (direction ②) opposite the first substrate surface 5901, and a substrate side surface 5903 surrounding the space between the first substrate surface 5901 and the second substrate surface 5902. According to an embodiment, the plurality of antenna elements 510, 520, 530, 540, and 550 may be arranged through the first substrate surface 5901. Accordingly, the array antenna AR1 may configured to form a directional beam in the first direction (direction ①) toward which the first substrate surface 5901 faces. For example, the plurality of antenna elements 510, 520, 530, 540, and 550 may be arranged in such a manner that they are exposed on the first substrate surface 5901 or embedded in the substrate 590. According to an embodiment, in the antenna structure 500, the first substrate surface 5901 of the substrate 590 may be arranged to face at least a part of the side surface (e.g., the side surface 310C of FIG. 3A) of an electronic device (e.g., the electronic device 300 of FIG. 3A). In some embodiments, in the antenna structure 500, the first substrate surface 5901 of the substrate 590 may be arranged to face at least a portion of the rear surface (e.g., the rear surface 310B of FIG. 3B) of an electronic device (e.g., the electronic device 300 of FIG. 3A).

According to various embodiments, the plurality of dielectrics 610, 620, 630, 640, and 650 may be arranged at positions corresponding to the plurality of antenna elements 510, 520, 530, 540, and 550 arranged on the substrate 590, respectively. For example, the plurality of dielectrics 610, 620, 630, 640, and 650 may be fixed to the first substrate surface 5901 of the substrate 590 through a bonding process such as soldering, bonding, or taping. According to an embodiment, when the first substrate surface 5901 is viewed from above, the plurality of dielectrics 610, 620, 630, 640, and 650 may be arranged to overlap at least partially the plurality of antenna elements 510, 520, 530, 540, and 550. For example, the plurality of dielectrics 610, 620, 630, 640, and 650 may include the first dielectric 610 corresponding to the first antenna element 510 and including a first dummy patch 611, the second dielectric 620 corresponding to the second antenna element 520 and including a second dummy patch 621, the third dielectric 630 corresponding to the third antenna element 530 and including a third dummy patch 631, the fourth dielectric 640 corresponding to the fourth antenna element 540 and including a fourth dummy patch 641, and/or the fifth dielectric 650 corresponding to the fifth antenna element 550 and including a fifth dummy patch 651. According to an embodiment, the plurality of dummy patches 611, 621, 631, 641, and 651 may help to improve the radiation performance of the array antenna AR1 operated by the antenna elements 510, 520, 530, 540, and 550. For example, the array antenna AR1 may be operated to have an extended bandwidth through the plurality of dummy patches 611, 621, 631, 641, and 651. In some embodiments, the plurality of dummy patches 611, 621, 631, 641, and 651 will be omitted.

According to various embodiments, the substrate 590 may be made of a material having a first dielectric constant. According to an embodiment, the plurality of dielectrics 610, 620, 630, 640, and 650 may be made of a material having a second dielectric constant different from the first dielectric constant. For example, the second dielectric constant may be greater than or equal to the first dielectric constant. According to an embodiment, the radiation performance of the array antenna AR1 may be determined by the second dielectric constant. For example, at least one of the resonant frequency, bandwidth, beamforming gain, peak gain, or beam coverage of the array antenna AR1 may be determined by the second dielectric constant of the plurality of dielectrics 610, 620, 630, 640, and 650. According to an embodiment, the size of the antenna structure 500 may be determined by the second dielectric constant.

According to various embodiments, the antenna structure 500 may include a wireless communication circuit 597 (e.g., the wireless communication module 192 of FIG. 1) arranged on the second substrate surface 5902. According to an embodiment, the wireless communication circuit 597 may be electrically connected to the plurality of antenna elements 510, 520, 530, 540, and 550. According to an embodiment, the wireless communication circuit 597 may be configured to transmit or receive a wireless signal in a frequency band of about 3 GHz to about 100 GHz through the array antenna AR1. In some embodiments, the wireless communication circuit 597 may be arranged in the inner space of an electronic device (e.g., the electronic device 300 of FIG. 3A), and may be electrically connected to the substrate 590 through an electrical connection cable (e.g., a flexible RF cable {FRC}).

According to various embodiments, the first dielectric 610 may include a first rigid surface 6101 facing a first direction (direction ①) and a second rigid surface 6102 facing a second direction (direction ②) opposite the first direction (direction ①). According to an embodiment, the first dielectric 610 may be arranged in such a manner that the second rigid surface 6102 faces the first substrate surface 5901. According to one embodiment, the antenna structure 500 may include a plurality of first conductive pads 5911 arranged on at least a partial area corresponding to the first dielectric 610 on the first substrate surface 5901. According to an embodiment, the first dielectric 610 may include a plurality of first solder pads 6111 which are exposed to the second rigid surface 6102 and arranged at positions corresponding to the plurality of first conductive pads 5911. According to an embodiment, the first dielectric 610 may be fixed to the first substrate surface 5901 of the substrate 590 in such a manner that the first conductive pads 5911 are bonded to the plurality of first solder pads 6111 arranged on the second rigid surface 6102 of the first dielectric 610 through a soldering process. According to an embodiment, when the first substrate surface 5901 is viewed from above, at least some of the plurality of first conductive pads 5911 may be arranged to overlap the first antenna element 510. According to an embodiment, when the first antenna element 510 is exposed to the first substrate surface 5901, the plurality of first conductive pads 5911 may be replaced with a partial area of the first antenna element 510. In this case, the plurality of first solder pads 6111 may operate as an antenna pattern. In some embodiments, when the first antenna element 510 is embedded in the substrate 590 and the plurality of first conductive pads 5911 are individually arranged, the plurality of first conductive pads 5911 and the plurality of first solder pads 6111 may be formed in a dummy pattern for bonding. According to an embodiment, the second antenna element 520, the third antenna element 530, the fourth antenna element 540, and the fifth antenna element 550 may include a plurality of second conductive pads 5921, a plurality of third conductive pads 5931, a plurality of fourth conductive pads 5941, and a plurality of fifth conductive pads 5951, respectively, and may be boned to the plurality of second solder pads (e.g., the second solder pads 6211 of FIG. 6A) of the second dielectric 620 and the plurality of pads (not shown) arranged on each of the third dielectric 630, the fourth dielectric 640, and the fifth dielectric 650 in substantially the same manner.

The antenna structure 500 according to embodiments of the disclosure may include five antenna elements 510, 520, 530, 540, and 550 and five dielectrics 610, 620, 630, 640, and 650 arranged to correspond thereto, but are not limited thereto. For example, the antenna structure 500 may include one antenna element 510 and one dielectric 610 corresponding thereto. In some embodiments, the antenna structure 500 may include two, three, four, or six or more antenna elements and the same number of dielectrics as the antenna elements.

Figure 6A:
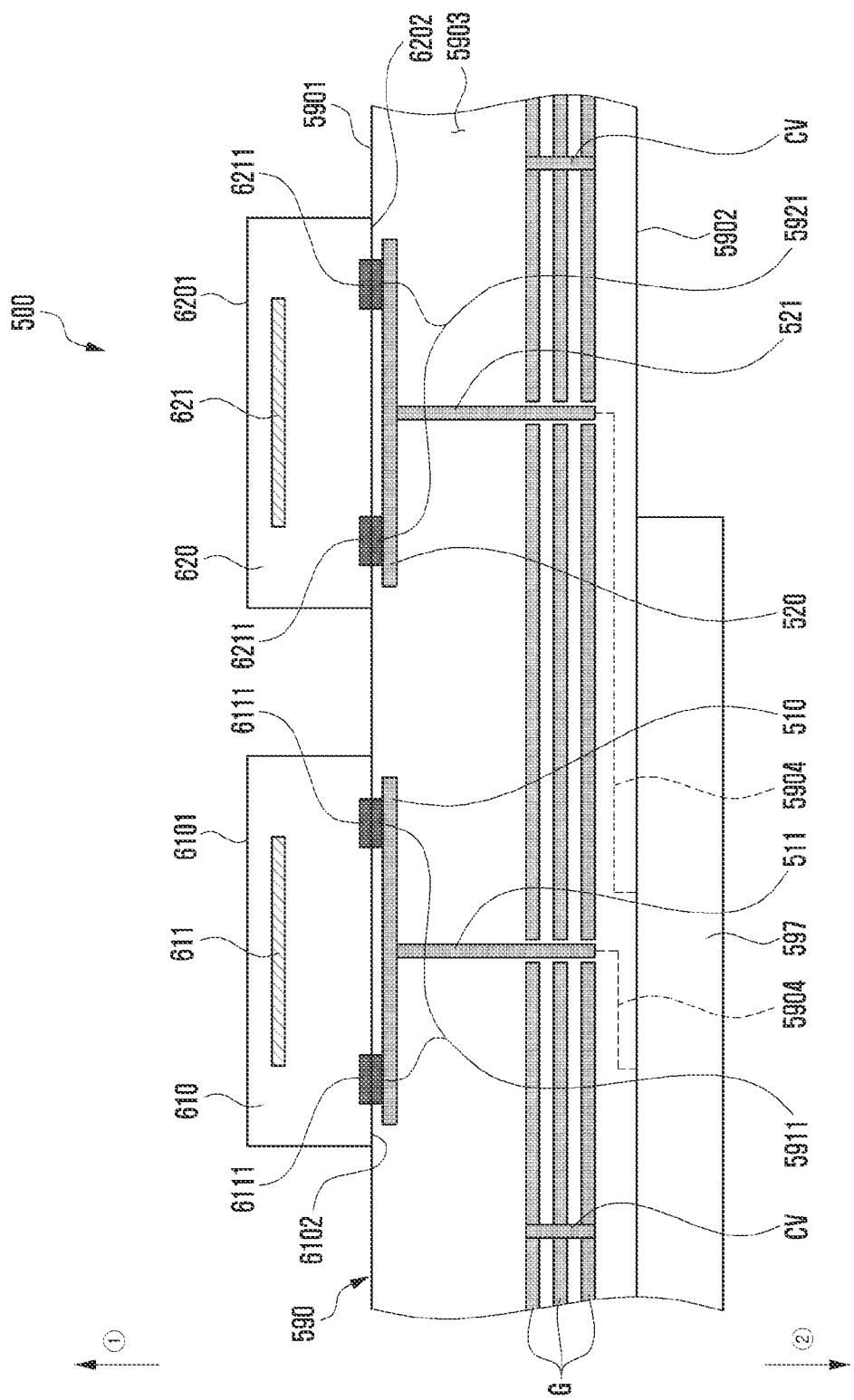
FIG. 6A is a partial cross-sectional view illustrating the antenna structure taken along line 6a-6a of FIG. 5B according to an embodiment of the disclosure.

FIG. 6A is a partial cross-sectional view illustrating the antenna structure taken along line 6a-6a of FIG. 5B according to an embodiment of the disclosure.

FIG. 6A illustrates and describes the arrangement structure of the first antenna element 510 and the first dielectric 610 and the arrangement structure of the second antenna element 520 and the second dielectric 620 on the substrate 590, but the remaining antenna elements 530, 540, and 550, and the remaining dielectrics 630, 640, and 650 may also have substantially the same arrangement structure.

Referring to FIG. 6A, the antenna structure 500 may include the substrate 590 including the first substrate surface 5901 facing a first direction (direction ①), the second substrate surface 5902 facing a direction (direction ②) opposite the first substrate surface 5901, and a plurality of insulating layers filling a space 5903 between the first substrate surface 5901 and the second substrate surface 5902, a plurality of antenna elements 510 and 520 arranged on the substrate 590, and a plurality of dielectrics 610 and 620 which are arranged on the first substrate surface 5901 and arranged to correspond to the plurality of antenna elements 510 and 520, respectively. According to an embodiment, the substrate 590 may include at least one ground plane G arranged on at least some of the plurality of insulating layers. According to an embodiment, the at least one ground plane G may be electrically connected through an electrical connection structure CV (e.g., a conductive via).

According to various embodiments, the antenna structure 500 may include the first antenna element 510 and the second antenna element 520 spaced apart from the first antenna element 510 at a designated interval. According to an embodiment, when the first substrate surface 5901 is viewed from above, the antenna structure 500 may include the first dielectric 610 arranged at least partially overlapping the first antenna element 510, and the second dielectric 620 arranged at least partially overlapping the second antenna element 520. According to an embodiment, the first dielectric 610 may include the first dummy patch 611 arranged at least partially overlapping the first antenna element 510 when the first substrate surface 5901 is viewed from above. According to an embodiment, the second dielectric 620 may include the second dummy patch 621 arranged at least partially overlapping the second antenna element 520 when the first substrate surface 5901 is viewed from above. According to an embodiment, the first dielectric 610 and the second dielectric 620 may be made of a high dielectric material. According to an embodiment, the first dielectric 610 and the second dielectric 620 may include a material having a dielectric constant in the range of 4 to 9. For example, the first dielectric 610 and the second dielectric 620 may be made of a ceramic material (e.g., low temperature cofired ceramics {LLCC}) having a higher dielectric constant than that of the substrate 590 (e.g., a printed circuit board). In some embodiments, the first dielectric 610 and the second dielectric 620 may be made of a material having the same dielectric constant as that of the substrate 590.

According to various embodiments, the first antenna element 510 may be electrically connected to the wireless communication circuit 597 through a first feeding unit 511 and a wiring structure 5904 connecting the first feeding unit 511 and the wireless communication circuit 597. According to an embodiment, the second antenna element 520 may be electrically connected to the wireless communication circuit 597 through a second feeding unit 521 and the wiring structure 5904 connecting the second feeding unit 521 and the wireless communication circuit 597. According to an embodiment, the first feeding unit 511 and the second feeding unit 521 may include at least one conductive via arranged to cross the substrate 590 in a vertical direction (in a direction facing from the first substrate surface 5901 to the second substrate surface 5902).

According to various embodiments, the first dielectric 610 may be fixed to the first substrate surface 5901 in such a manner that the plurality of first conductive pads 5911 arranged on the first substrate surface 5901 and the plurality of first solder pads 6111 arranged on the second rigid surface 6102 of the first dielectric 610 are bonded to each other through a soldering process. According to an embodiment, the second dielectric 620 may be fixed to the first substrate surface 5901 in such a manner that the plurality of second conductive pads 5921 arranged on the first substrate surface 5901 and the plurality of second solder pads 6211 arranged on the second rigid surface 6202 of the second dielectric 620 are bonded to each other through a soldering process. Here, reference numeral 6101 denotes the first rigid surface of the first dielectric 610, and reference numeral 6201 denotes the first rigid surface of the second dielectric 620. In some embodiments, the first dummy patch 611 and/or the second dummy patch 621 may be replaced with at least some of the solder pads 6111 and 6211.

According to embodiments of the disclosure, the radiation performance of the antenna structure 500 may be determined through the dielectric constants of the dielectrics 610 and 620 arranged to correspond to the antenna elements 510 and 520, respectively. For example, the operating frequency band of the antenna structure 500 may be determined through the dielectric constants of the dielectrics 610 and 620. In some embodiments, the size of the antenna structure 500 may be determined through the dielectric constants of the dielectrics 610 and 620 arranged to correspond to the antenna elements 510 and 520, respectively. In some embodiments, the bandwidth of the antenna structure 500 may be determined by the arrangement positions or shapes of the first dummy patch 611 and the second dummy patch 621 arranged on the first dielectric 610 and the second dielectric 620, respectively.

Figure 6B:
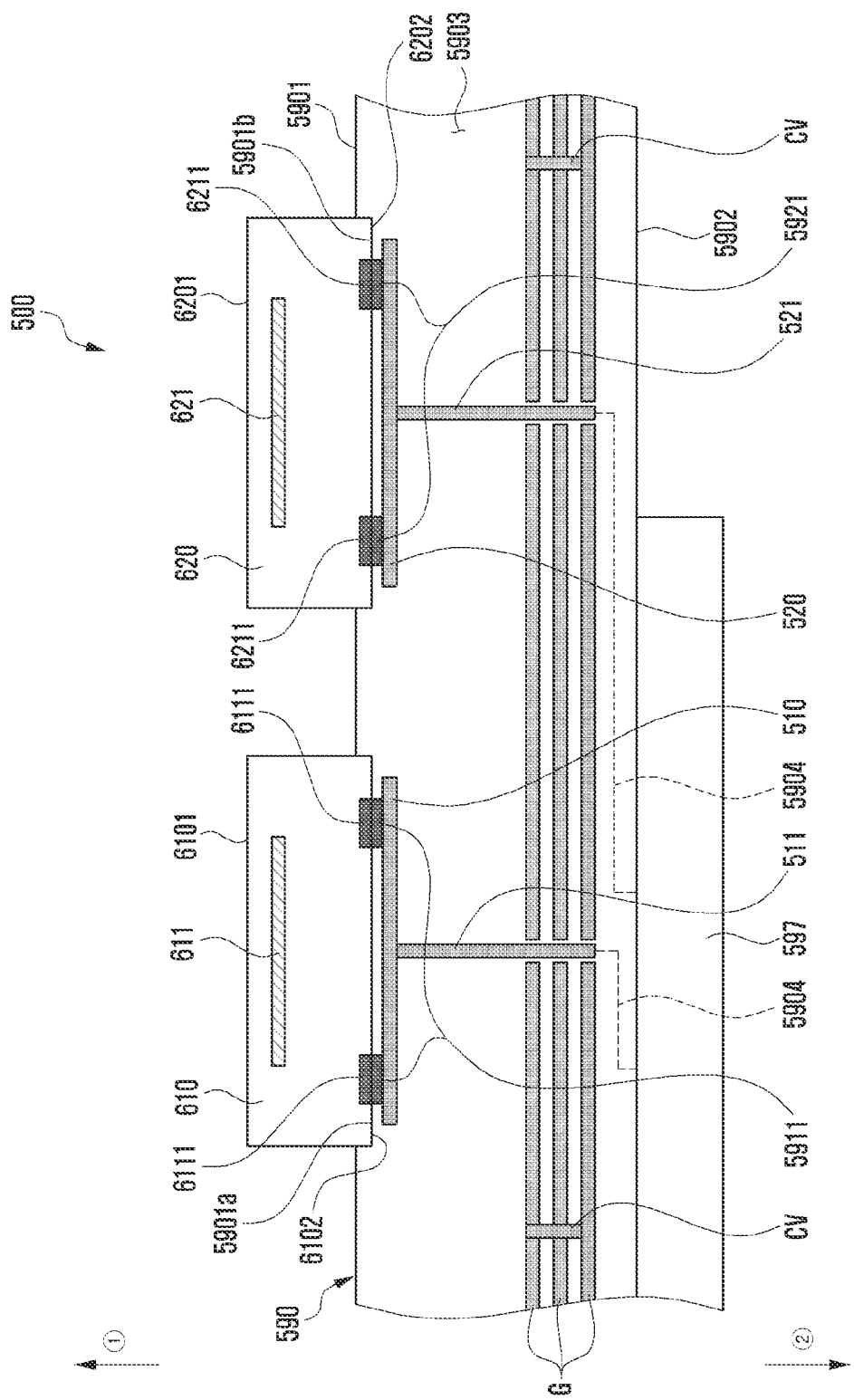
FIG. 6B is a partial cross-sectional view illustrating an antenna structure according to an embodiment of the disclosure.

FIG. 6B is a is a partial cross-sectional view illustrating an antenna structure according to an embodiment of the disclosure.

In describing the antenna structure 500 of FIG. 6B, the same reference numerals are assigned to the components substantially the same as those of the antenna structure 500 of FIG. 6A, and a detailed description thereof will be omitted.

Referring to FIG. 6B, the substrate 590 may include a plurality of recesses 5901a and 5901b spaced apart from each other on the first substrate surface 5901 at a predetermined interval. According to an embodiment, the plurality of recesses 5901a and 5901b may include a first recess 5901a accommodating at least a portion of the first dielectric 610, and a second recess 5901b accommodating at least a portion of the second dielectric 620. According to an embodiment, the plurality of first conductive pads 5911 and the plurality of second conductive pads 5921 may be arranged to be exposed to the outside in the first recess 5901a and the second recess 5901b. According to an embodiment, since the plurality of dielectrics 610 and 620 are accommodated in the plurality of recesses 5901a and 5901b, respectively, separation of the dielectrics 610 and 620 due to external impact may be reduced. Although not shown, the remaining dielectrics (e.g., the third dielectric 630, the fourth dielectric 640, and the fifth dielectric 650 of FIG. 5A) may also be arranged on the first substrate surface 5901 of the substrate 590 in substantially the same manner.

Figure 7A:
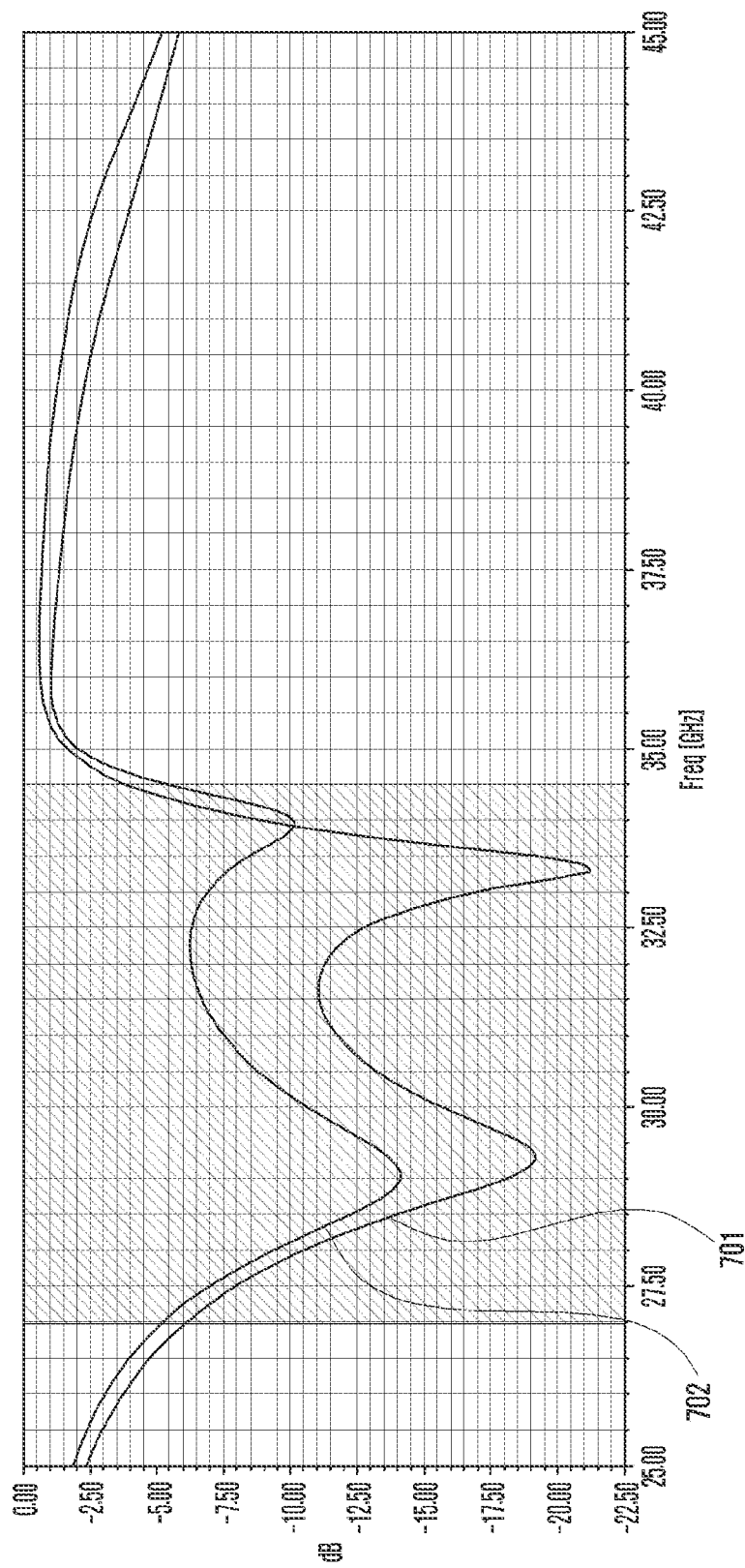
FIG. 7A is a graph illustrating a comparison between the radiation characteristic of the antenna structure of FIG. 5A and the radiation characteristic of a conventional antenna structure according to an embodiment of the disclosure.

FIG. 7A is a graph illustrating a comparison between the radiation characteristic of the antenna structure of FIG. 5A and the radiation characteristic of a conventional antenna structure according to an embodiment of the disclosure.

Graph 701 is a return loss graph of the antenna structure 500 in which only at least one antenna element operates while the dielectrics 610, 620, 630, 640, and 650 are omitted, and graph 702 is a return loss graph of the antenna structure in which the size of at least one antenna element is relatively reduced and the dielectrics 610, 620, 630, 640, and 650 having a dielectric constant for compensating for the reduction in the size are arranged.

Referring to FIG. 7A, when comparing the bandwidth of −6 dB, it can be seen that the existing antenna structure exhibits a bandwidth of 7.2 GHz (graph 701), and the antenna structure 500 according to the disclosure exhibits a bandwidth of 7.1 GHz, which is equivalent to the existing one (graph 702).

This may mean that, when the sizes of the antenna elements 510, 520, 530, 540, and 550 are reduced and the dielectrics 610, 620, 630, 640, and 650 made of a material having a relatively high dielectric constant to compensate for the reduction in the size are applied, the antenna elements may be operated to have a bandwidth equal to the bandwidth before the reduction in the size so that the size of the substrate 590 may be reduced.

Figure 7B:
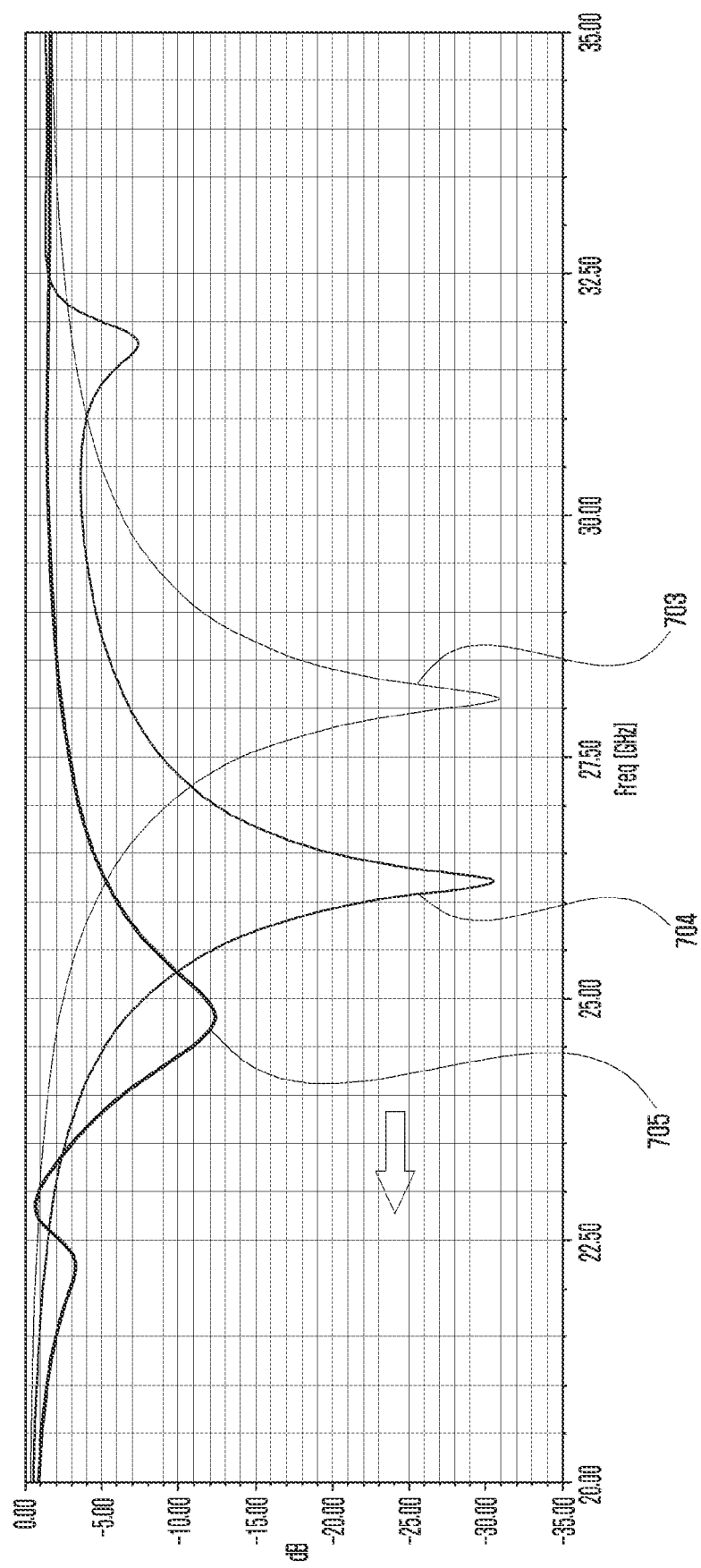
FIG. 7B is a graph illustrating a frequency change state according to a change in a dielectric constant of a dielectric in the antenna structure of FIG. 5A according to an embodiment of the disclosure.

FIG. 7B is a graph illustrating a frequency change state according to a change in a dielectric constant of a dielectric in the antenna structure of FIG. 5A according to an embodiment of the disclosure.

Referring to FIG. 7B, graph 703 is a return loss graph of the antenna structure including dielectrics having a first dielectric constant (e.g., dielectric constant 1), graph 704 is a return loss graph of the antenna structure including dielectrics having a second dielectric constant (e.g., dielectric constant 3) higher than the first dielectric constant, and graph 705 is a return loss graph of the antenna structure including dielectrics having a third dielectric constant (e.g., dielectric constant 6) higher than the second dielectric constant.

Referring to FIG. 7B, it can be seen that the operating frequency band of the antenna structure is shifted to a low band as the dielectric constant of the dielectric increases. This may mean that the antenna structure can be operated in various operating frequency bands by adjusting the dielectric constants of the dielectrics while the sizes of the antenna elements are fixed. In addition, even if the operating frequency band of the antenna structure is shifted to an unwanted high band by reducing the size of the antenna element, dielectrics having a designated constant are applied so that the operating frequency band can be shifted to the original operating frequency band, and it is possible to help to reduce the size of the antenna structure (e.g., the substrate).

Figure 8A:
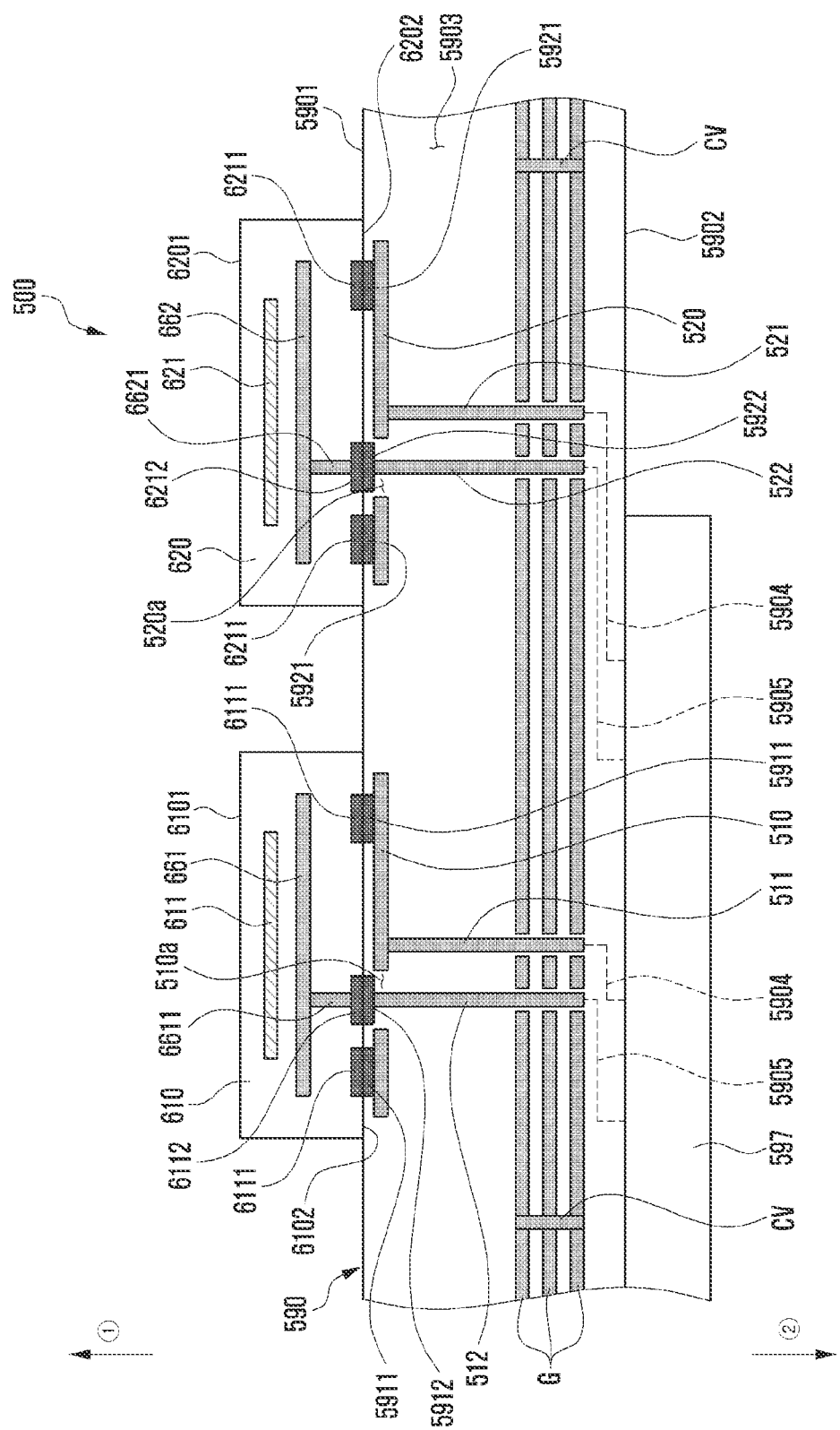
FIGS. 8A and 8B are partial cross-sectional views illustrating an antenna structure according to various embodiments of the disclosure.
Figure 8B:
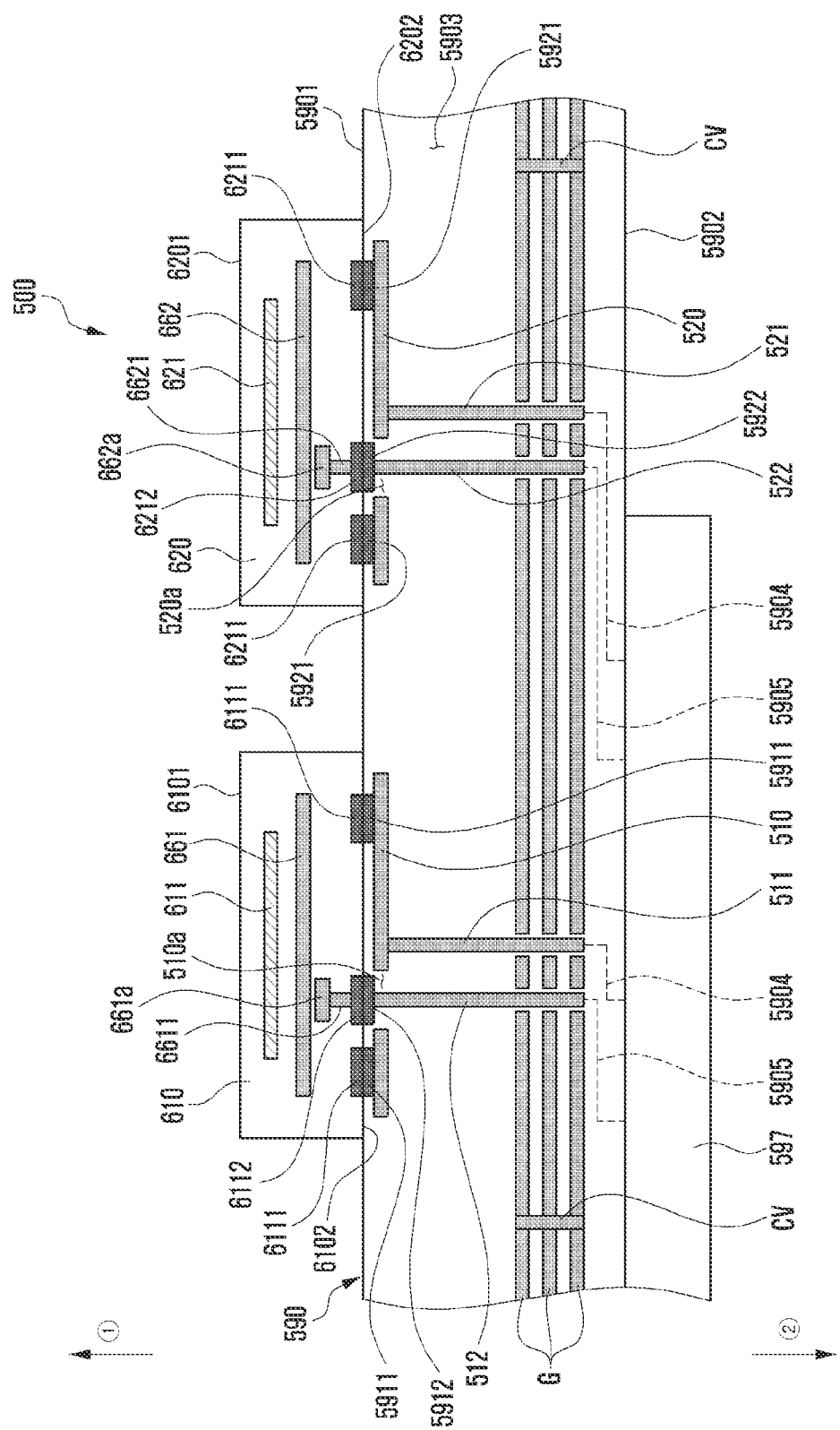

FIGS. 8A and 8B are partial cross-sectional views illustrating an antenna structure according to various embodiments of the disclosure.

In describing the antenna structure 500 of FIGS. 8A and 8B, the same reference numerals are assigned to the components substantially the same as those of the antenna structure 500 of FIG. 6A, and a detailed description thereof will be omitted.

Referring to FIG. 8A, the antenna structure 500 may include the substrate 590 including the first substrate surface 5901 facing a first direction (direction ①), the second substrate surface 5902 facing a direction (direction ②) opposite the first substrate surface 5901, and a plurality of insulating layers filling the space 5903 between the first substrate surface 5901 and the second substrate surface 5902, the plurality of antenna elements 510 and 520 arranged on the substrate 590, and a plurality of dielectrics 610 and 620 which are arranged on the first substrate surface 5901, arranged to correspond to the plurality of antenna elements 510 and 520, respectively, and include other plurality of antenna elements 661 and 662. According to an embodiment, the substrate 590 may include at least one ground plane G arranged on at least some insulating layers of the plurality of insulating layers. According to an embodiment, the at least one ground plane G may be electrically connected through an electrical connection structure (CV) (e.g., conductive via).

According to various embodiments, the antenna structure 500 may include the first antenna element 510 and the second antenna element 520 spaced apart from the first antenna element 510 by a predetermined interval. According to an embodiment, when the first substrate surface 5901 is viewed from above, the antenna structure 500 may include the first dielectric 610 arranged to at least partially overlap the first antenna element 510 and the second dielectric 620 arranged to at least partially overlap the second antenna element 520. According to an embodiment, when the first substrate surface 5901 is viewed from above, the first dielectric 610 may include a first additional antenna element 661 arranged to at least partially overlap the first antenna element 510. According to an embodiment, the first additional antenna element 661 may include a conductive patch arranged in a space between the first rigid surface 6101 and the second rigid surface 6102 of the first dielectric 610. According to an embodiment, the second dielectric 620 may include a second additional antenna element 662 arranged to at least partially overlap the second antenna element 520 when the first substrate surface 5901 is viewed from above. According to an embodiment, the second additional antenna element 662 may include a conductive patch arranged in a space between the first rigid surface 6201 and the second rigid surface 6202 of the second dielectric 620. According to an embodiment, when the first substrate surface 5901 is viewed from above, the first dielectric 610 may include a first dummy patch 611 arranged to at least partially overlap the first additional antenna element 661 between the first rigid surface 6101 and the first additional antenna element 661. According to an embodiment, when the first substrate surface 5901 is viewed from above, the second dielectric 620 may include a second dummy patch 621 arranged to at least partially overlap the second additional antenna element 662 between the first rigid surface 6201 and the second additional antenna element 662.

According to various embodiments, the first antenna element 510 may be electrically connected to the wireless communication circuit 597 through the first feeding unit 511 and the wiring structure 5904 connecting the first feeding unit 511 and the wireless communication circuit 597. According to an embodiment, the second antenna element 520 may be electrically connected to the wireless communication circuit 597 through the second feeding unit 521 and the wiring structure 5904 connecting the second feeding unit 521 and the wireless communication circuit 597. According to an embodiment, the first feeding unit 511 and the second feeding unit 521 may include at least one conductive via arranged to cross the substrate 590 in a vertical direction (e.g., in a direction facing from the first substrate surface 5901 to the second substrate surface 5902).

According to various embodiments, the first additional antenna element 661 may be arranged on the substrate 590, and may be electrically connected to the wireless communication circuit 597 through a third feeding unit 512 that is electrically connected through the wiring structure 5905 connected to the wireless communication circuit 597, a first feeding pad 5912 that is electrically connected to the third feeding unit 512 and is exposed to the first substrate surface 5901, a second feeding pad 6112 that is exposed to the second rigid surface 6102 of the first dielectric 610 and is bonded to the first feeding pad 5912 through soldering, and a first extension portion 6611 that connects the second feeding pad 6112 and the first additional antenna element 661. According to an embodiment, the second additional antenna element 662 may be arranged on the substrate 590, and may be electrically connected to the wireless communication circuit 597 through a fourth feeding unit 522 that is electrically connected through the wiring structure 5905 connected to the wireless communication circuit 597, a third feeding pad 5922 that is electrically connected to the fourth feeding unit 522 and is exposed to the first substrate surface 5901, a fourth feeding pad 6212 that is exposed to the second rigid surface 6202 of the second dielectric 620 and is bonded to the third feeding pad 5922 through soldering, and a second extension portion 6621 connecting the fourth feeding pad 6212 and the second additional antenna element 662. According to an embodiment, the third feeding unit 512 and the first feeding pad 5912 may be arranged to pass through a first through-hole 510a provided in at least a portion of the first antenna element 510. According to an embodiment, the fourth feeding unit 522 and the third feeding pad 5922 may be arranged to pass through a second through-hole 520a provided in at least a portion of the second antenna element 520. According to an embodiment, the third feeding unit 512 and the fourth feeding unit 522 may include at least one conductive via arranged to cross the substrate 590 in a vertical direction (e.g., in a direction facing from the first substrate surface 5901 to the second substrate surface 5902). According to an embodiment, the first extension portion 6611 may include a conductive via arranged perpendicularly in a direction facing from the first rigid surface 6101 to the second rigid surface 6102 of the first dielectric 610. According to an embodiment, the second extension portion 6621 may include a conductive via arranged perpendicularly in a direction from the first rigid surface 6201 to the second rigid surface 6202 of the second dielectric 620.

According to various embodiments, the wireless communication circuit 597 may be configured to transmit or receive a wireless signal in a first frequency band through the first antenna element 510 and the second antenna element 520. According to an embodiment, the wireless communication circuit 597 may be configured to transmit or receive a wireless signal in a second frequency band different from the first frequency band through the first additional antenna element 661 and the second additional antenna element 662. According to an embodiment, the first frequency band may be lower than the second frequency band. For example, the first frequency band may include a band of 28 GHz, and the second frequency band may include a band of 39 GHz. Accordingly, the antenna structure 500 may be used as a dual-band antenna operating in different frequency bands.

Referring to FIG. 8B, the first extension portion 6611 may be electrically connected to and capacitively coupled to the first additional antenna element 661 through a first coupling pad 661a arranged at the end of the first extension portion 6611 without contacting the first additional antenna element 661. According to an embodiment, the second extension portion 6621 may be also electrically connected to and capacitively coupled to the second additional antenna element 662 through a second coupling pad 662a arranged at the end of the second extension portion 6621 without contacting the second additional antenna element 662.

Figure 9A:
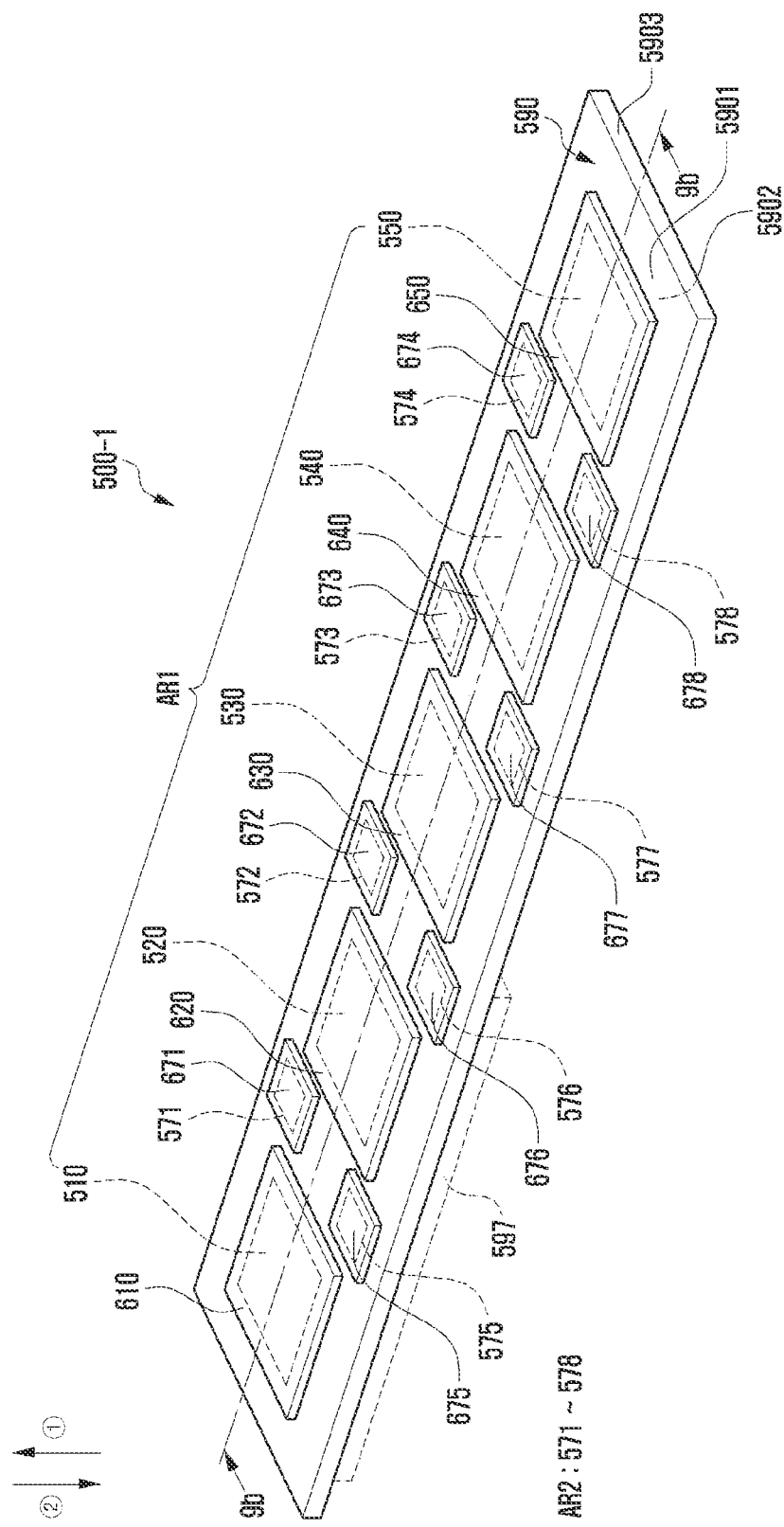
FIG. 9A is a perspective view illustrating an antenna structure according to an embodiment of the disclosure.
Figure 9B:
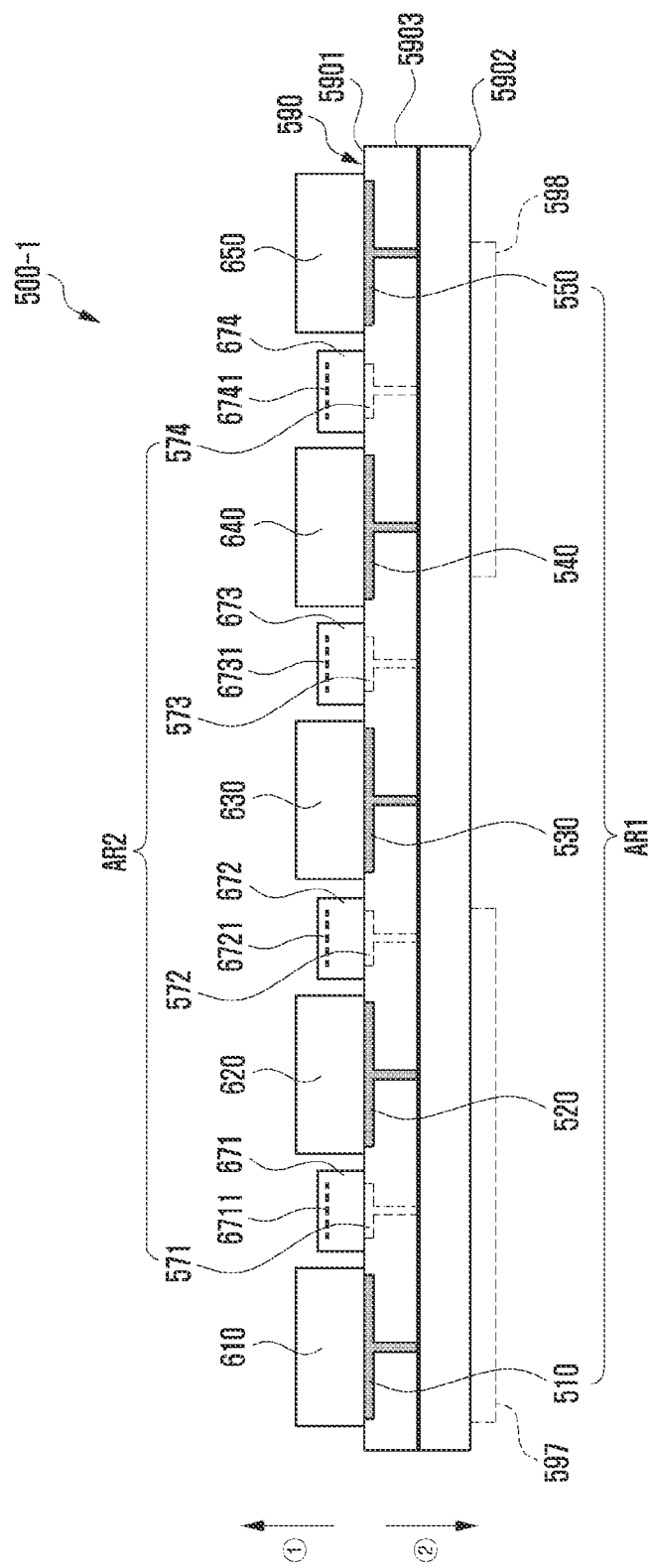
FIG. 9B is a cross-sectional view illustrating an antenna structure taken along line 9b-9b of FIG. 9A according to an embodiment of the disclosure.

FIG. 9A is a perspective view illustrating an antenna structure according to an embodiment of the disclosure. FIG. 9B is a cross-sectional view illustrating an antenna structure taken along line 9b-9b of FIG. 9A according to an embodiment of the disclosure.

An antenna structure 500-1 of FIGS. 9A and 9B may be at least partially similar to the third antenna module 246 of FIG. 2, or may further include other embodiments of the antenna structure.

In describing the antenna structure 500-1 of FIGS. 9A and 9B, the same reference numerals are assigned to the components substantially the same as those of the antenna structure 500 of FIGS. 5A and 5B, and a detailed description thereof will be omitted.

Referring to FIGS. 9A and 9B, the antenna structure may include the substrate 590 made of a material having a first dielectric constant, and a first array antenna AR1 (e.g., the array antenna AR1 of FIG. 5A) and/or a second array antenna AR2 arranged near the first array antenna. According to an embodiment, the substrate 590 may include the first substrate surface 5901 facing a first direction (direction ①), the second substrate surface 5902 facing a second direction (direction ②) opposite the first direction (direction ①), and a substrate side surface 5903 surrounding the space between the first substrate surface 5901 and the second substrate surface 5902. According to an embodiment, the first array antenna AR1 may include the plurality of first antenna elements 510, 520, 530, 540, and 550 arranged on the first substrate surface 5901 at a designated interval. According to an embodiment, the plurality of first antenna elements 510, 520, 530, 540, and 550 may include the first antenna element 510, the second antenna element 520, the third antenna element 530, the fourth antenna element 540, and the fifth antenna element 550 arranged at predetermined intervals with respect to each other. According to an embodiment, the plurality of first antenna elements 510, 520, 530, 540, and 550 may be electrically connected to the first wireless communication circuit 597 (e.g., the wireless communication circuit 597 of FIGS. 5A and 5B) arranged on the second substrate surface 5902 of the substrate 590. For example, the first wireless communication circuit 597 may be configured to form a directional beam in the first direction (direction ①) through the first array antenna AR1. According to an embodiment, the first wireless communication circuit 597 may be configured to transmit and/or receive a radio signal in a first frequency band through the first array antenna AR1. According to an embodiment, the first frequency band may include a frequency band (e.g., mmWave) in a range of about 25 GHz to 45 GHz.

According to various embodiments, when the first substrate surface 5901 is viewed from above, the antenna structure 500-1 may include a plurality of first dielectrics 610, 620, 630, 640, and 650 which are arranged on the first substrate surface 5901 to overlap the plurality of first antenna elements 510, 520, 530, 540, and 550, respectively, and are made of a material having a second dielectric constant. According to an embodiment, the plurality of first dielectrics 610, 620, 630, 640, and 650 may include the first dielectric 610 arranged to correspond to the first antenna element 510, the second dielectric 620 arranged to correspond to the second antenna element 520, the third dielectric 630 arranged to correspond to the third antenna element 530, the fourth dielectric 640 arranged to correspond to the fourth antenna element 540, and the fifth dielectric 650 arranged to correspond to the fifth antenna element 550. According to an embodiment, the first dielectric constant of the substrate 590 may be the same as or different from the second dielectric constant of the plurality of first dielectrics 610, 620, 630, 640, and 650. For example, the second dielectric constant may be higher than the first dielectric constant.

According to various embodiments, when the first substrate surface 5901 is viewed from above, the second array antenna AR2 may include a plurality of second antenna elements 571, 572, 573, 574, 575, 576, 577, and 578 arranged near the plurality of first antenna elements 510, 520, 530, 540, and 550. According to an embodiment, when the first substrate surface is viewed from above, the plurality of second antenna elements 571, 572, 573, 574, 575, 576, 577, and 578 may be at least partially arranged between the plurality of first antenna elements 510, 520, 530, 540, and 550. In this case, the plurality of first antenna elements 510, 520, 530, 540, and 550 and the plurality of second antenna elements 571, 572, 573, 574, 575, 576, 577, and 578 may be arranged on the same layer of the substrate. In some embodiments, when the first substrate surface 5901 is viewed from above, at least one antenna element of the plurality of second antenna elements 571, 572, 573, 574, 575, 576, 577, and 578 may be arranged to at least partially overlap at least one antenna element of the plurality of first antenna elements 510, 520, 530, 540, and 550. In this case, the plurality of first antenna elements 510, 520, 530, 540, and 550 and the plurality of second antenna elements 571, 572, 573, 574, 575, 576, 577, and 578 may be arranged on different layers of the substrate 590. For example, the plurality of second antenna elements 571, 572, 573, 574, 575, 576, 577, and 578 may be arranged on a layer of the substrate having a greater distance from the first substrate surface 5901 than the plurality of first antenna elements 510, 520, 530, 540, and 550. According to an embodiment, the plurality of second antenna elements 571, 572, 573, 574, 575, 576, 577, and 578 may include the sixth antenna element 571, the seventh antenna element 572, the eighth antenna element 573, the ninth antenna element 574, the tenth antenna element 575, the eleventh antenna element 576, the twelfth antenna element 577, and the thirteenth antenna element 578 which are arranged at designated intervals with respect to each other. According to an embodiment, the plurality of second antenna elements 571, 572, 573, 574, 575, 576, 577, and 578 may include conductive patches arranged on the substrate 590. According to an embodiment, the plurality of second antenna elements 571, 572, 573, 574, 575, 576, 577, and 578 may be electrically connected to a second wireless communication circuit 598 arranged on the second substrate surface 5902 of the substrate 590. For example, the second wireless communication circuit 598 may be configured to form a directional beam in the first direction (direction ①) through the second array antenna AR2. According to an embodiment, the second wireless communication circuit 598 may be configured to transmit and/or receive a radio signal in a second frequency band different from the first frequency band through the second array antenna AR2. According to an embodiment, the second frequency band may include a frequency band (e.g., 802.11ay band) in the range of about 55 GHz to 70 GHz.

According to various embodiments, when the first substrate surface 5901 is viewed from above, the antenna structure 500-1 may include a plurality of second dielectrics 671, 672, 673, 674, 675, 676, 677, and 678 which are arranged on the first substrate surface 5901 to overlap the plurality of second antenna elements 571, 572, 573, 574, 575, 576, 577, and 578, respectively, and are made of a material having a third dielectric constant. According to an embodiment, the plurality of second dielectrics 671, 672, 673, 674, 675, 676, 677, and 678 may include the sixth dielectric 671 arranged to correspond to the sixth antenna element 571, the seventh dielectric 672 arranged to correspond to the seventh antenna element 572, the eighth dielectric 673 arranged to correspond to the eighth antenna element 573, the ninth dielectric 674 arranged to correspond to the ninth antenna element 574, the tenth dielectric 675 arranged to correspond to the tenth antenna element 575, the eleventh dielectric 676 arranged to correspond to the eleventh antenna element 576, the twelfth dielectric 677 arranged to correspond to the twelfth antenna element 577, and the thirteenth dielectric 678 arranged to correspond to the thirteenth antenna element 578. According to an embodiment, the dielectric constant of the second plurality of dielectrics 671, 672, 673, 674, 675, 676, 677, and 678 and the dielectric constant of the substrate 590 may be the same or different from each other. According to an embodiment, the plurality of second antenna elements 571, 572, 573, 574, 575, 576, 577, and 578 may have substantially the same substrate arrangement structure as that of the plurality of antenna elements (e.g., the plurality of antenna elements 510, 520, 530, 540, and 550 of FIG. 5A) shown in FIGS. 5A and 6B. In some embodiments, each of the plurality of second dielectrics 671, 672, 673, 674, 675, 676, 677, and 678 may include a plurality of dummy patches 6711, 6721, 6731, and 6741 arranged to affect the radiation performance (e.g., bandwidth) of the plurality of second antenna elements 571, 572, 573, 574, 575, 576, 577, and 578. According to an embodiment, a second dielectric constant of the plurality of first dielectrics 610, 620, 630, 640, and 650 may be the same as or different from a third dielectric constant of the plurality of second dielectrics 671, 672, 673, 674, 675, 676, 677, and 678. In some embodiments, the first dielectric constant of the substrate 590, the second dielectric constant of the plurality of first dielectrics 610, 620, 630, 640, and 650, and the third dielectric constant of the plurality of second dielectrics 671, 672, 673, 674, 675, 676, 677, and 678 may be the same or different from each other. According to an embodiment, the number of the plurality of first antenna elements 510, 520, 530, 540, and 550 and the plurality of second antenna elements 571, 572, 573, 574, 575, 576, 577, and 578 may not be limited.

According to various embodiments, the radiation performance (e.g., operating frequency band) of the first array antenna AR1 may be determined through the second dielectric constant of the plurality of first dielectrics 610, 620, 630, 640, and 650 arranged to correspond to the plurality of first antenna elements 510, 520, 530, 540, and 550. In some embodiments, the size of the antenna structure 500-1 (e.g., the substrate 590) may be determined through the second dielectric constant of the plurality of first dielectrics 610, 620, 630, 640, and 650. According to an embodiment, the radiation performance (e.g., operating frequency band) of the second array antenna AR2 may be determined through the third dielectric constant of the plurality of second dielectrics 671, 672, 673, 674, 675, 676, 677, and 678 arranged to correspond to the plurality of second antenna elements 571, 572, 573, 574, 575, 576, 577, and 578.

Figure 10A:
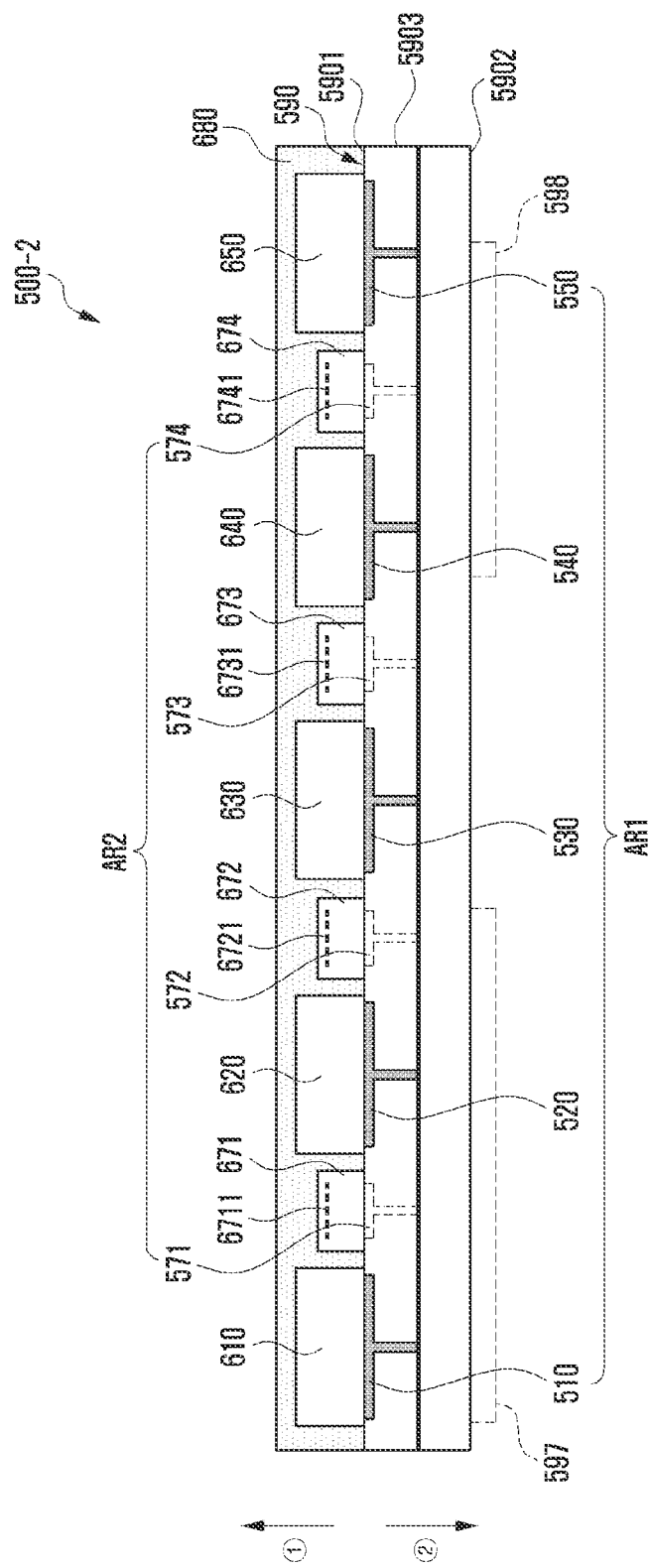
FIGS. 10A, 10B, and 10C are cross-sectional views illustrating an antenna structure according to various embodiments of the disclosure.
Figure 10B:
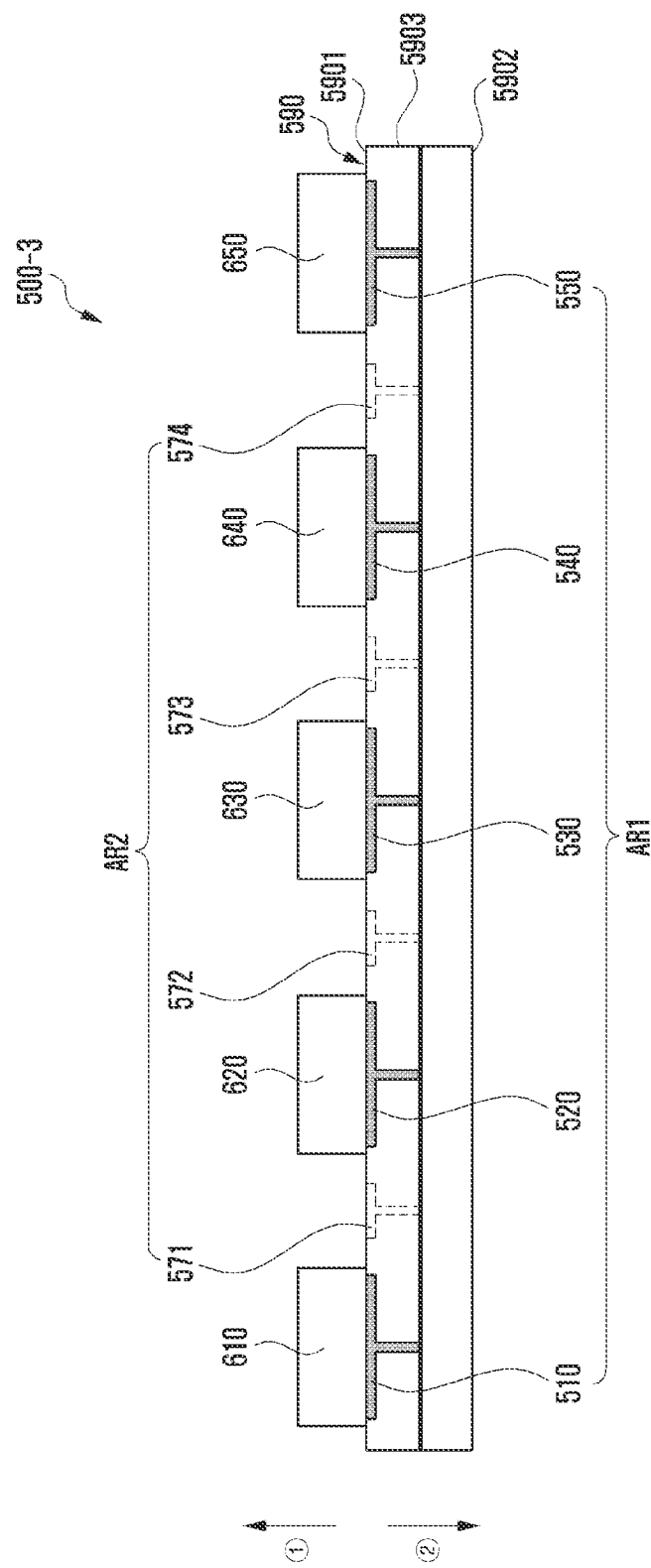
Figure 10C:
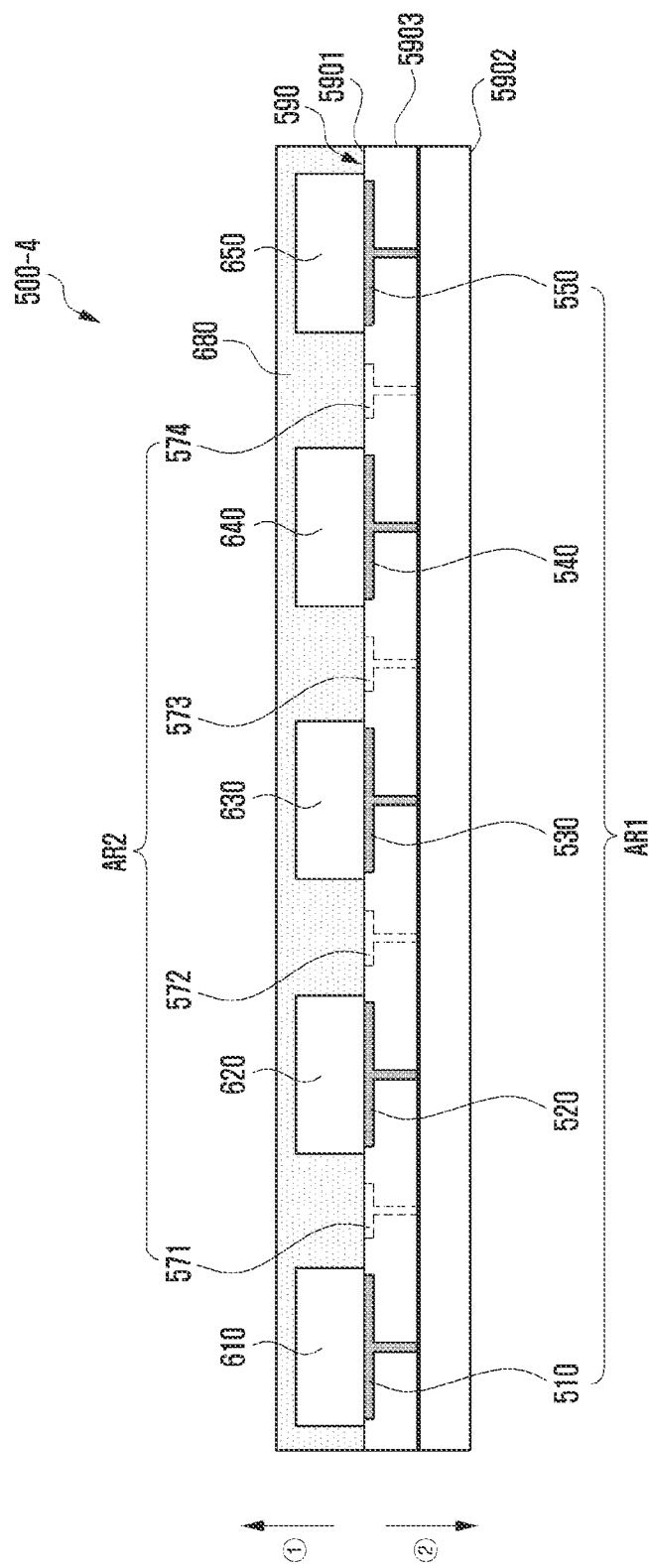

FIGS. 10A, 10B, and 10C are cross-sectional views illustrating an antenna structure according to various embodiments of the disclosure.

In describing antenna structures 500-2, 500-3 and 500-4 of FIGS. 10A to 10C, the same reference numerals are assigned to the components substantially the same as those of the antenna structure 500-1 of FIGS. 9A and 9B, and a detailed description thereof will be omitted.

Referring to FIG. 10A, in the antenna structure 500-1 of FIG. 9B, the antenna structure 500-2 may include a fourth dielectric 680 which is stacked with a designated thickness on the first substrate surface 5901 and is made of a material having a fourth dielectric constant. According to an embodiment, the fourth dielectric 680 may include a mold material stacked on the first substrate surface 5901 of the substrate 590. According to an embodiment, the fourth dielectric 680 may be arranged in such a manner to be stacked on the first substrate surface 5901 and to cover the plurality of first dielectrics 610, 620, 630, 640, and 650 and/or the plurality of second dielectrics 671, 672, 673, and 674. In some embodiments, the fourth dielectric 680 may be arranged in such a manner to be stacked on the first substrate surface 5901 and to cover only the plurality of second dielectrics 671, 672, 673, and 674. In this case, the stacked thickness of the fourth dielectric 680 may be less than or equal to the height of the plurality of first dielectrics 610, 620, 630, 640, and 650. According to an embodiment, the fourth dielectric constant of the fourth dielectric 680 may be the same as or different from the dielectric constants of the substrate 590, the plurality of first dielectrics 610, 620, 630, 640, and 650, or the plurality of second dielectrics 671, 672, 673, and 674.

According to various embodiments, the fourth dielectric 680 additionally stacked on the first substrate surface 5901 may help to determine the radiation performance of the first array antenna AR1 and/or the second array antenna AR2, or reduce the size of the antenna structure 500-2. According to an embodiment, the fourth dielectric 680 may be stacked on the first substrate surface 5901 of the substrate 590, thereby helping to reinforce the rigidity of the antenna structure 500-2.

Referring to FIG. 10B, in the antenna structure 500-1 of FIG. 9B, the antenna structure 500-3 may be provided in a state in which the plurality of second dielectrics (e.g., the plurality of second dielectrics 671, 672, 673, and 674 of FIG. 9B) are omitted.

Referring to FIG. 10C, in the antenna structure 500-3 of FIG. 10B, the antenna structure 500-4 may include the fourth dielectric 680 which is stacked with a designated thickness on the first substrate surface 5901 while the plurality of second dielectrics (e.g., the plurality of second dielectrics 671, 672, 673, and 674 of FIG. 9B) are omitted. In this case, the fourth dielectric 680 may be provided with a thickness covering the plurality of first dielectrics 610, 620, 630, 640, and 650 to determine the radiation performance of the first array antenna AR1 and/or the second array antenna AR2, or to help to reduce the size of the antenna structure 500-4 and reinforce the rigidity of the antenna structure 500-4.

Figure 11A:
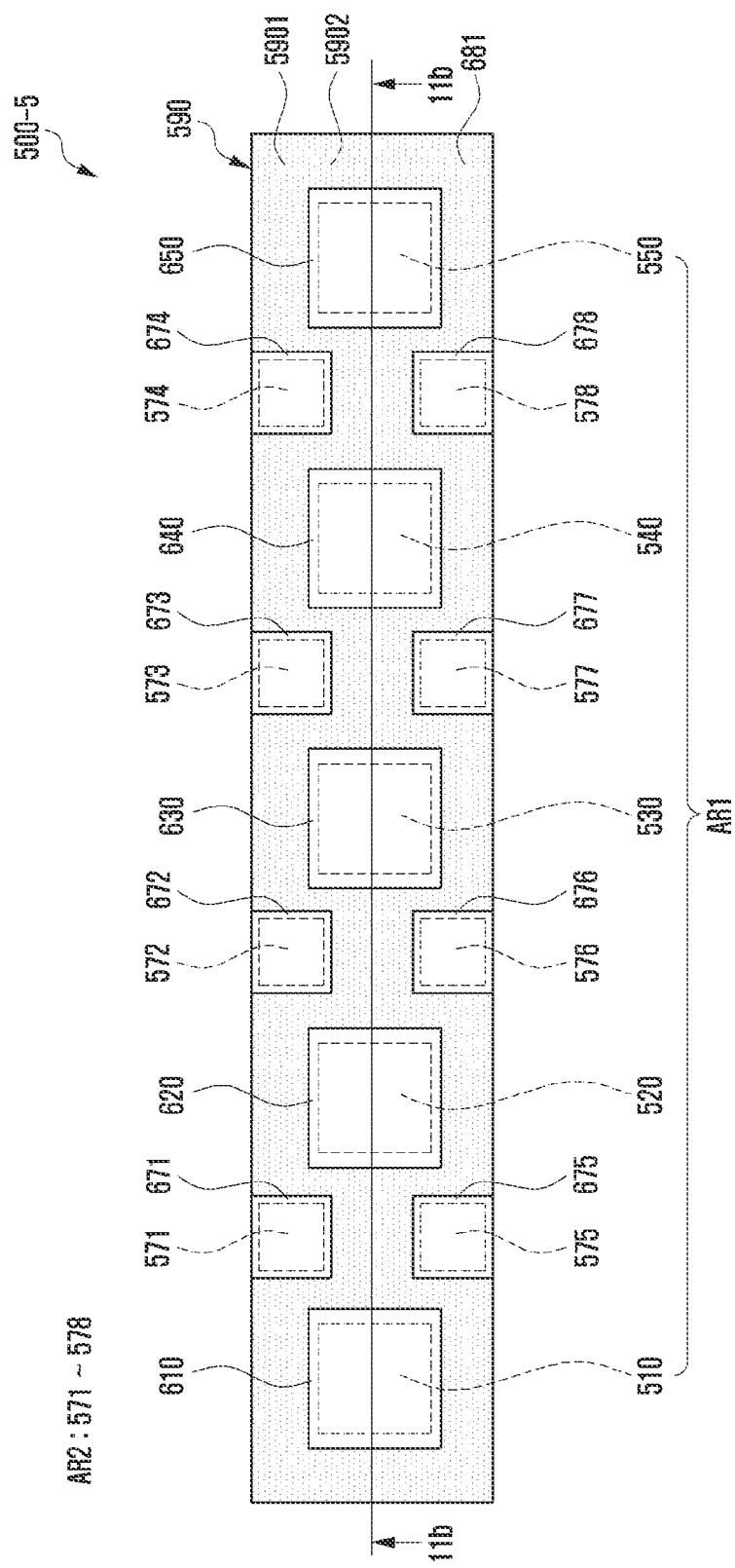
FIG. 11A is a plan view illustrating an antenna structure according to an embodiment of the disclosure.
Figure 11B:
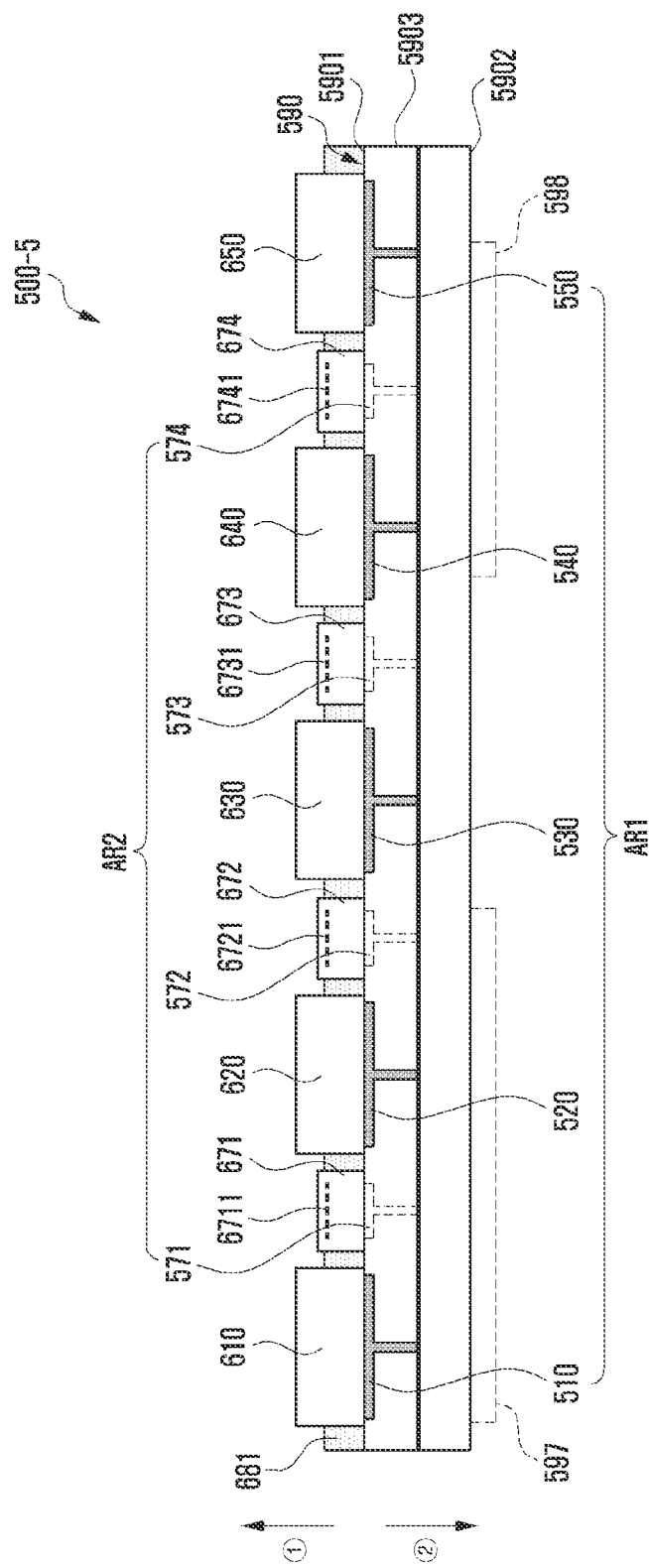
FIG. 11B is a cross-sectional view illustrating an antenna structure taken along line 11b-11b of FIG. 11A according to an embodiment of the disclosure.

FIG. 11A is a plan view illustrating an antenna structure according to an embodiment of the disclosure. FIG. 11B is a cross-sectional view illustrating an antenna structure taken along line 11b-11b of FIG. 11A according to an embodiment of the disclosure.

In describing the antenna structure 500-5 of FIGS. 11A and 11B, the same reference numerals are given to the components substantially the same as those of the antenna structure 500-1 of FIGS. 9A and 9B, and a detailed description thereof will be omitted.

Referring to FIGS. 11A and 11B, the antenna structure 500-2 may include a conductive layer 681 that is stacked with a designated thickness on the first substrate surface 5901 in the antenna structure 500-1 of FIGS. 9A and 9B. According to an embodiment, the conductive layer 681 may be arranged on the first substrate surface 5901 of the substrate 590 through plating, sputtering, bonding, or a surface mounting device (SMD) process. In some embodiments, the conductive layer 681 may include a metal plate attached to the first substrate surface 5901. According to an embodiment, when the first substrate surface 5901 is viewed from above, the conductive layer 681 may be stacked on the first substrate surface 5901 and arranged in such a manner to avoid (non-overlap) the plurality of first dielectrics 610, 620, 630, 640, and 650 and the plurality of second dielectrics 671, 672, 673, 674, 675, 676, 677, and 678. According to an embodiment, the thickness of the conductive layer 681 may be provided not to be higher than the heights of the plurality of first dielectrics 610, 620, 630, 640, and 650 and the plurality of second dielectrics 671, 672, 673, 674, 675, 676, 677, and 678. In some embodiments, the conductive layer 681 may be arranged on at least one layer close to the first substrate surface 5901 of the substrate 590 as a component of the substrate 590.

According to various embodiments, the conductive layer 681 stacked on the first substrate surface 5901 may help to improve the isolation of each of the plurality of first antenna elements 510, 520, 530, 540, and 550, and each of the plurality of second antenna elements 571, 572, 573, 574, 575, 576, 577, and 578, and to reinforce the rigidity of the antenna structure 500-5.

Figure 12A:
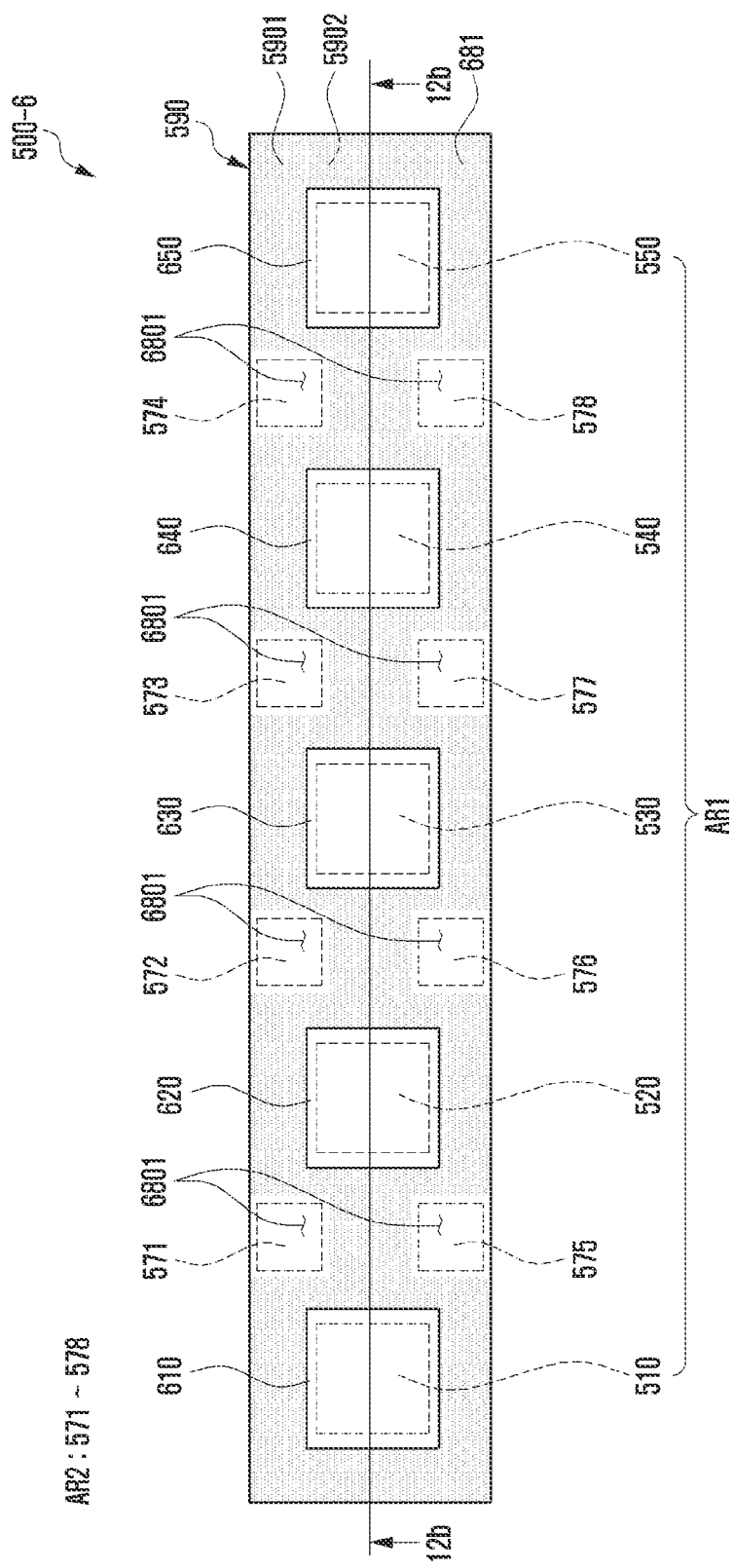
FIG. 12A is a plan view illustrating an antenna structure according to an embodiment of the disclosure.
Figure 12B:
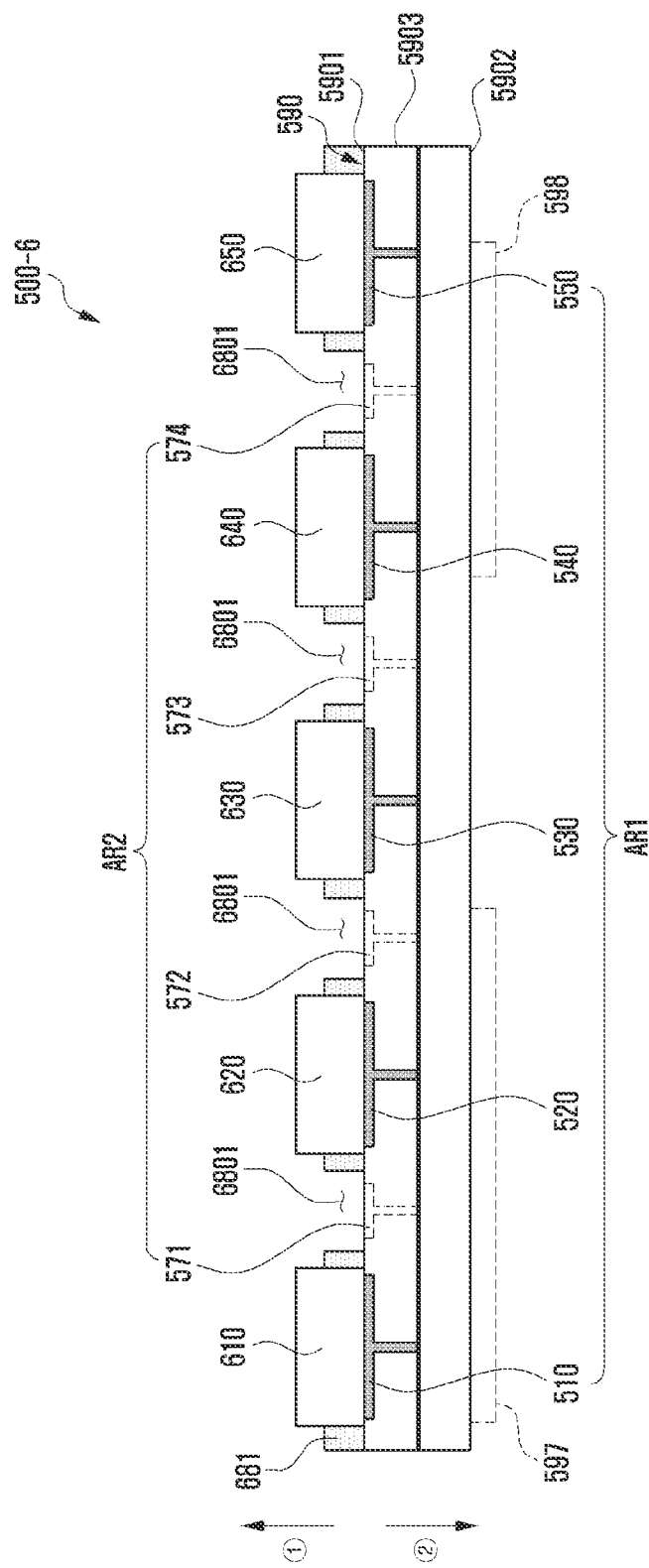
FIG. 12B is a cross-sectional view illustrating an antenna structure taken along line 12b-12b of FIG. 12A according to an embodiment of the disclosure.

FIG. 12A is a plan view illustrating an antenna structure according to an embodiment of the disclosure. FIG. 12B is a cross-sectional view illustrating an antenna structure taken along line 12b-12b of FIG. 12A according to an embodiment of the disclosure.

In describing an antenna structure 500-6 of FIGS. 12A and 12B, the same reference numerals are assigned to the components substantially the same as those of the antenna structures 500-1 and 500-3 of FIGS. 9A, 9B, and 10B, and a detailed description thereof will be omitted.

Referring to FIGS. 12A and 12B, the antenna structure 500-6 may include a conductive layer 681 stacked with a designated thickness on the first substrate surface 5901 in the antenna structure 500-3 of FIG. 10B. According to an embodiment, the conductive layer 681 may be arranged on the first substrate surface 5901 of the substrate 590 through plating, sputtering, bonding, or a surface mounting device (SMD) process. In some embodiments, the conductive layer 681 may include a metal plate attached to the first substrate surface 5901. According to an embodiment, when the first substrate surface 5901 is viewed from above, the conductive layer 681 may be stacked on the first substrate surface 5901, and may be arranged in such a manner to avoid (e.g., non-overlap) the plurality of second antenna elements 571, 572, 573, 574, 575, 576, 577, and 578, and the plurality of second dielectrics 671, 672, 673, and 674. According to an embodiment, since the antenna structure 500-6 does not include the plurality of second dielectrics (e.g., the plurality of second dielectrics 671, 672, 673, 674, 675, 676, 677, and 678 of FIG. 9A), when the first substrate surface 5901 is viewed from above, the conductive layer 681 may include a non-conductive area 6801 in which an area overlapping the plurality of second antenna elements 571, 572, 573, 574, 575, 576, 577, and 578 is omitted. In some embodiments, the conductive layer 681 may be arranged on at least one layer close to the first substrate surface 5901 of the substrate 590 as a component of the substrate 590.

According to various embodiments, the conductive layer 681 stacked on the first substrate surface 5901 may help to improve the isolation of each of the plurality of first antenna elements 510, 520, 530, 540, and 550, and the plurality of second antenna elements 571, 572, 573, 574, 575, 576, 577, and 578, and to reinforce the rigidity of the antenna structure 500-5.

The arrangement of the fourth dielectric 680 and/or the conductive layer 681 according to embodiments of the disclosure may be applied to the antenna structure 500 shown in FIGS. 5A to 5C, and 6A in substantially the same manner.

Figure 13A:
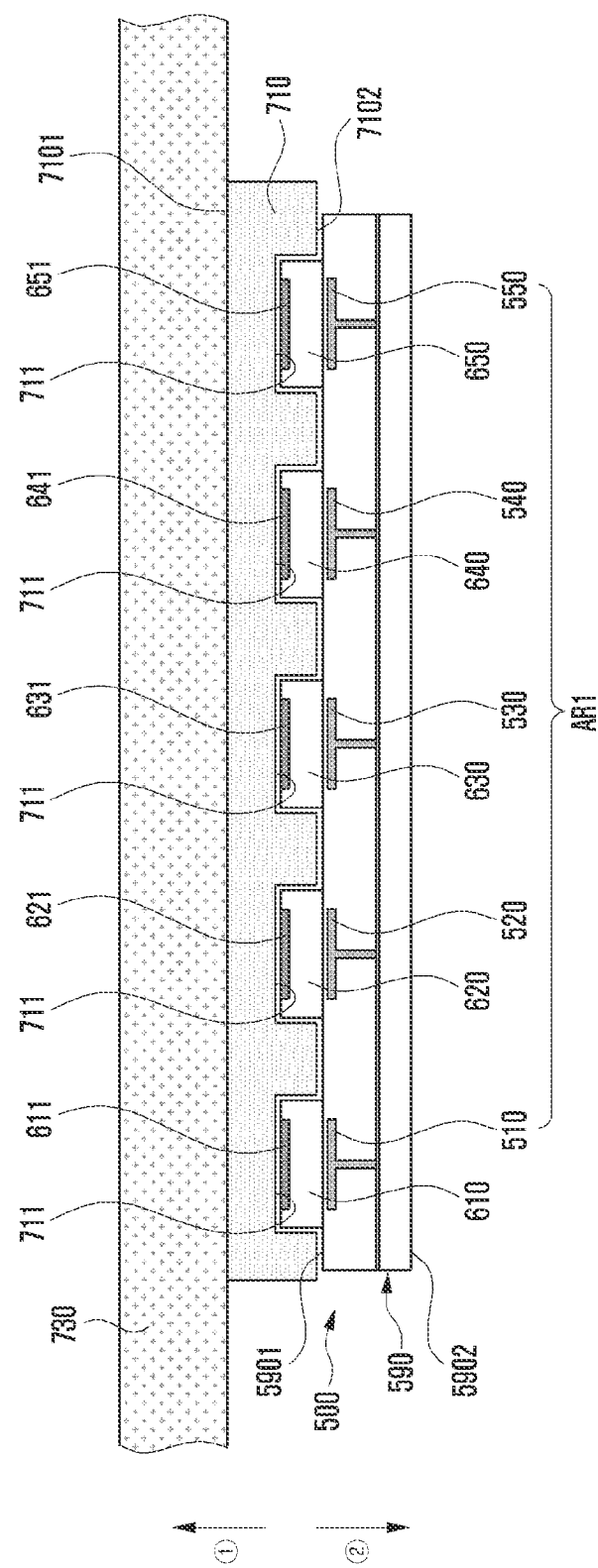
FIG. 13A is a cross-sectional view illustrating a state in which an antenna structure is supported through a support member according to an embodiment of the disclosure.
Figure 13B:
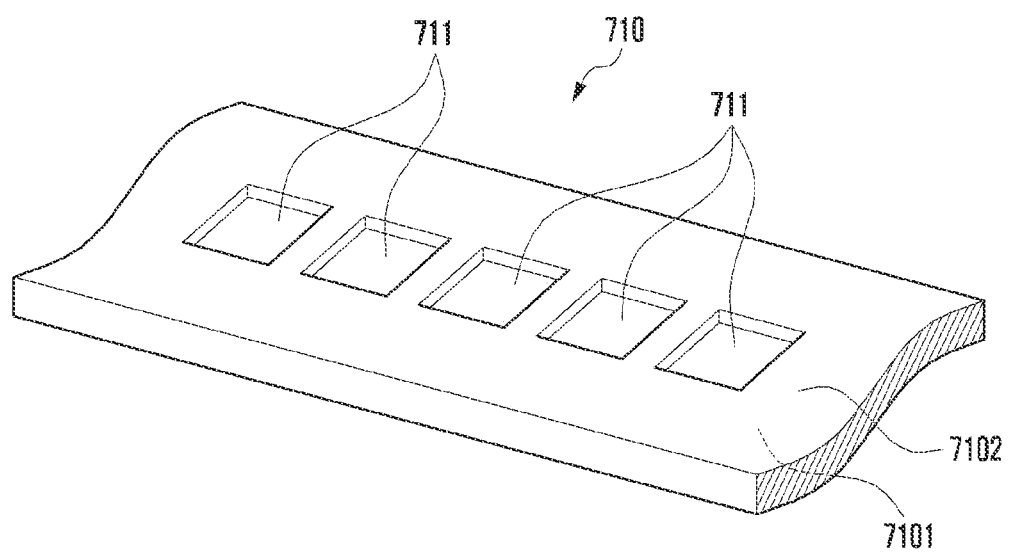
FIG. 13B is a partial perspective view illustrating the support member of FIG. 13A according to an embodiment of the disclosure.

FIG. 13A is a cross-sectional view illustrating a state in which an antenna structure is supported through a support member according to an embodiment of the disclosure. FIG. 13B is a partial perspective view illustrating the support member of FIG. 13A according to an embodiment of the disclosure.

The antenna structure 500 of FIGS. 13A and 13B may be substantially the same as the antenna structure 500 of FIGS. 5A to 5C, and 6A, or may further include other embodiments of the antenna structure. For example, the antenna structure 500 of FIGS. 13A and 13B may be replaced with any one of the antenna structures 500-1, 500-2, 500-3, 500-4, 500-5, and 500-6 of FIGS. 9A, 9B, 10A to 10C, 11A, and 11B.

Referring to FIGS. 13A and 13B, the antenna structure 500 may be arranged to be supported through some components of an electronic device (e.g., the electronic device 300 of FIG. 3C), thereby helping to reinforce the rigidity. According to an embodiment, the antenna structure 500 may include the substrate 590, the plurality of antenna elements 510, 520, 530, 540, and 550 as an array antenna AR arranged on the substrate 590 at a designated interval, and the plurality of dielectrics 610, 620, 630, 640, and 650 arranged at positions corresponding to the plurality of antenna elements 510, 520, 530, 540, and 550 on the substrate 590, respectively.

According to various embodiments, the antenna structure 500 may be arranged between a cover member 730 (e.g., the rear plate 311 of FIG. 3C) of an electronic device (e.g., the electronic device 300 of FIG. 3C) and a support member 710 (e.g., the first support member 3211 or the second support member 360 of FIG. 3C) arranged in the internal space. According to an embodiment, the support member 710 may include a first support surface 7101 facing the cover member 730 and a second support surface 7102 facing the antenna structure 500. According to an embodiment, the support member 710 may be arranged such that the first support surface 7101 faces the inner surface of the cover member 730 and the second support surface 7102 faces the first substrate surface 5901 of the substrate 590. According to an embodiment, the support member 710 may be provided with a designated depth from the second support surface 7102, and may include a plurality of recesses 711 arranged at positions corresponding to the plurality of dielectrics 610, 620, 630, 640, and 650. According to an embodiment, the antenna structure 500 may be arranged in such a manner that the plurality of dielectrics 610, 620, 630, 640, and 650 is accommodated in the plurality of recesses 711 of the support member 710, respectively. According to an embodiment, the plurality of recesses 711 may be provided with a depth in which the plurality of dielectrics 610, 620, 630, 640, and 650 are accommodated and the second support surface 7102 of the support member 710 faces the first substrate surface 5901 of at least the substrate 590. Accordingly, the antenna structure 500 may have a rigid reinforcing structure that can withstand external impact through a seating structure in which the plurality of dielectrics 610, 620, 630, 640, and 650 are accommodated in the recesses 711. According to various embodiments, the support member 710 may be made of a non-conductive material having a designated dielectric constant. In this case, the antenna structure 500 may help to determine the radiation performance through the support member 710 overlapping the plurality of dielectrics 610, 620, 630, 640, and 650.

Figure 14A:
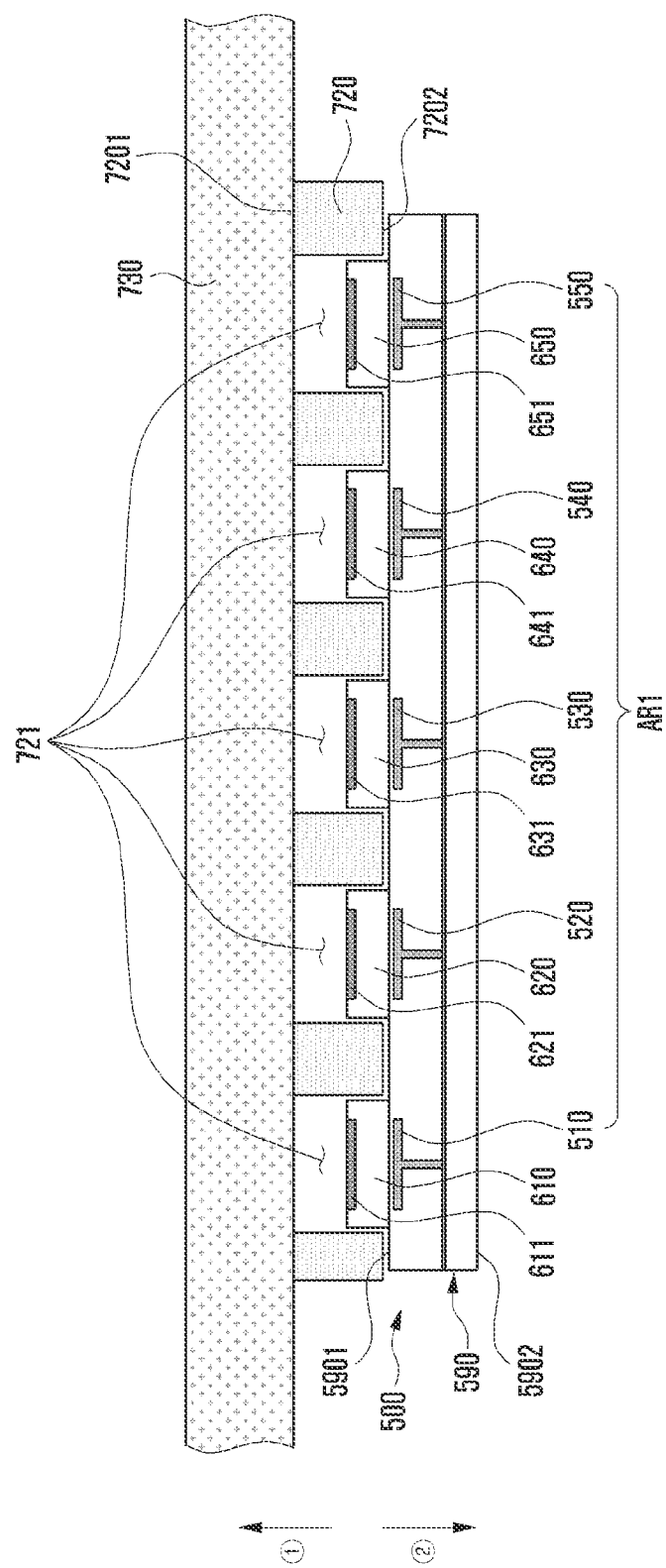
FIG. 14A is a cross-sectional view illustrating a state in which an antenna structure is supported through a support member according to an embodiment of the disclosure.
Figure 14B:
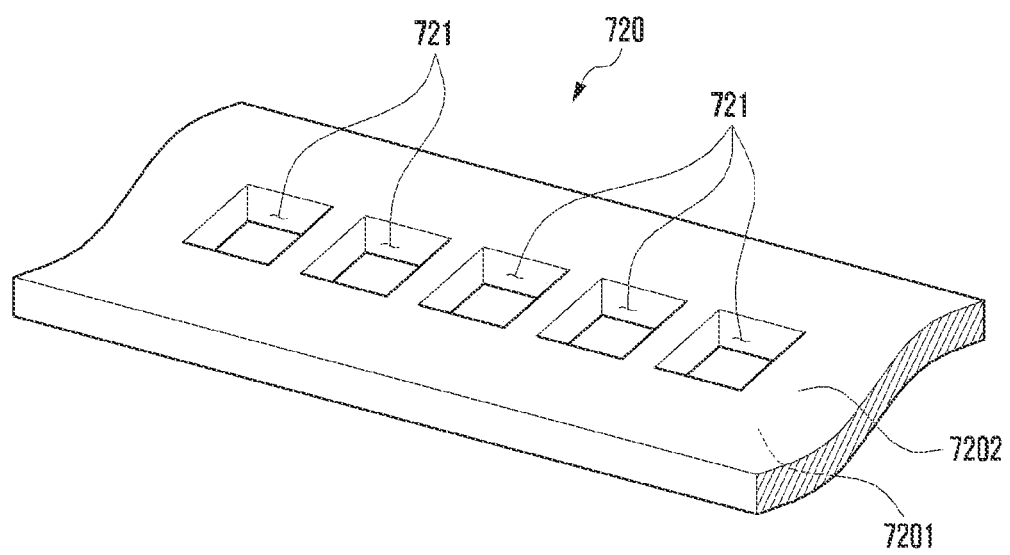
FIG. 14B is a partial perspective view illustrating the support member of FIG. 14A according to an embodiment of the disclosure.

FIG. 14A is a cross-sectional view illustrating a state in which an antenna structure is supported through a support member according to an embodiment of the disclosure. FIG. 14B is a partial perspective view illustrating the support member of FIG. 14A according to an embodiment of the disclosure.

The antenna structure 500 of FIGS. 14A and 14B may be substantially the same as the antenna structure 500 of FIGS. 5A to 5C, and 6A, or may further include other embodiments of the antenna structure. For example, the antenna structure 500 of FIGS. 14A and 14B may be replaced with any one of the antenna structures 500-1, 500-2, 500-3, 500-4, 500-5, and 500-6 of FIGS. 9A, 9B, 10A to 10C, 11A, and 11B.

Referring to FIGS. 14A and 14B, the antenna structure 500 may be arranged to be supported by some components of an electronic device (e.g., the electronic device 300 of FIG. 3C), thereby helping to reinforce the rigidity. According to an embodiment, the antenna structure 500 may include the substrate 590, the plurality of antenna elements 510, 520, 530, 540, and 550 as an array antenna AR arranged on the substrate 590 at a designated interval, and the plurality of dielectrics 610, 620, 630, 640, and 650 arranged at positions corresponding to the plurality of antenna elements 510, 520, 530, 540, and 550, respectively, on the substrate 590.

According to various embodiments, the antenna structure 500 may be arranged between the cover member 730 (e.g., the rear plate 311 of FIG. 3C) of the electronic device (e.g., the electronic device 300 of FIG. 3C) and the support member 720 (e.g., the first support member 3211 or the second support member 360 of FIG. 3C) arranged in the inner space. According to an embodiment, the support member 720 may include a first support surface 7201 facing the cover member 730 and a second support surface 7202 facing the antenna structure 500. According to an embodiment, the support member 710 may be arranged such that the first support surface 7201 faces the inner surface of the cover member 730 and the second support surface 7202 faces the first substrate surface 5901 of the substrate 590. According to an embodiment, the support member 720 may include a plurality of through-holes 721 arranged at positions corresponding to the plurality of dielectrics 610, 620, 630, 640, and 650. According to an embodiment, the antenna structure 500 may be arranged in such a manner that each of the plurality of dielectrics 610, 620, 630, 640, and 650 is at least partially penetrated through each of the plurality of through-holes 721 of the support member 710. Accordingly, the antenna structure 500 may have a rigid reinforcing structure that can withstand external impact through a through structure in which the plurality of dielectrics 610, 620, 630, 640, and 650 are accommodated in the through-holes 721.

According to various embodiments, the support member 710 may be made of a conductive material. In this case, when the first substrate surface 5901 is viewed from above, the antenna structure 500 may have the arrangement structure that does not overlap the plurality of antenna elements 510, 520, 530, 540, and 550 through the through structure in which the plurality of dielectrics 610, 620, 630, 640, and 650 are penetrated in the through-holes 721, thereby helping to improve isolation.

According to various embodiments, an electronic device (e.g., the electronic device 300 of FIG. 3A) may include a housing (e.g., the housing 310 of FIG. 3A), an antenna structure (e.g., the antenna structure 500-3 of FIG. 10B) including a substrate (e.g., the substrate 590 of FIG. 10B) having a first substrate surface (e.g., the first substrate surface 5901 of FIG. 10B) and a second substrate surface (e.g., the second substrate surface 5902 of FIG. 10B) facing a direction opposite the first substrate surface and having a first dielectric constant, a plurality of antenna elements (e.g., the plurality of first antenna elements 510, 520, 530, 540, and 550 of FIG. 10B) arranged on the substrate at a designated interval and configured to form a directional beam in a direction toward which the first substrate surface faces, and at least one dielectric (e.g., the plurality of first dielectrics 610, 620, 630, 640, and 650 of FIG. 10B) arranged on the first substrate surface and having a second dielectric constant, as an antenna structure (e.g., the antenna structure 500 of FIG. 10B) arranged in an inner space of the housing, and a first wireless communication circuit (e.g., the wireless communication circuit 597 of FIG. 5A) disposed in the inner space and configured to at least one of transmit or receive a wireless signal in at least one first frequency band through the plurality of antenna elements.

According to various embodiments, the second dielectric constant may be greater than the first dielectric constant.

According to various embodiments, the at least one dielectric may be arranged to entirely cover the first substrate surface.

According to various embodiments, the at least one dielectric may be bonded to the first substrate surface through bonding or taping.

According to various embodiments, the wireless communication circuit may be configured to transmit or receive a wireless signal in a frequency band in a range of 3 GHz to 100 GHz through the antenna structure.

According to various embodiments, the housing may at least partially include a support member, and the first substrate surface may be arranged to correspond to the support member.

According to various embodiments, the support member may include a plurality of recesses, and at least a portion of the at least one dielectric may be arranged to be seated in the recess.

According to various embodiments, a portion of the at least one dielectric seated in the recess may be provided at a position corresponding to each of the plurality of antenna elements.

According to various embodiments, the support member may be made of a non-conductive material.

According to various embodiments, the housing may include a front plate, a rear plate facing in a direction opposite the front plate, and a side member configured to at least partially surround a space between the front plate and the rear plate and including a conductive member and a non-conductive member, and the support member may be arranged to be supported through the non-conductive member.

According to various embodiments, at least a portion of the conductive member may include a plurality of through-holes, and each of the plurality of through-holes may be arranged at a position corresponding to each of the plurality of antenna elements.

According to various embodiments, the directional beam may be provided in a direction toward which the side surface faces through at least a portion of the side member.

According to various embodiments, in the inner space, the electronic device may further include a display disposed so as to be visible from the outside through at least a portion of the front plate.

According to various embodiments, the electronic device may further include at least one of a conductive patch or a conductive pattern disposed on the at least one dielectric and at least partially overlapping each of the plurality of antenna elements when the first substrate surface is viewed from above.

According to various embodiments, the at least one dielectric may include at least one solder pad provided on an outer surface, and the at least one dielectric may be bonded to at least one conductive pad exposed on the first substrate surface through a soldering process.

According to various embodiments, the electronic device may further include a wireless communication circuit disposed on the second substrate surface, wherein the at least one of the conductive patch or the conductive pattern may be electrically connected to the wireless communication circuit through at least one of the at least one dielectric or at least one conductive via arranged on the substrate.

According to various embodiments, the electronic device may further include a conducive dummy patch disposed on the at least one dielectric and at least partially overlapping each of the plurality of antenna elements when the first substrate surface is viewed from above.

According to various embodiments, the at least one dielectric may be bonded to the first substrate surface through bonding or taping.

According to various embodiments, an electronic device (e.g., the electronic device 300 of FIG. 3A) may include a housing (e.g., the housing 310 of FIG. 3A), an antenna structure including a substrate (e.g., the substrate 590 of FIG. 5A) having a first substrate surface (e.g., the first substrate surface 5901 of FIG. 5A) and a second substrate surface (e.g., the second substrate surface 5902 of FIG. 5A) facing a direction opposite the first substrate surface, and having a first dielectric constant, a plurality of first antenna elements (e.g., the plurality of first antenna elements 510, 520, 530, 540, and 550 of FIG. 5A) disposed at the substrate at a designated interval, and a plurality of first dielectrics (e.g., the plurality of first dielectrics 610, 620, 630, 640, and 650 of FIG. 5A) disposed on the first substrate surface and configured to have a second dielectric constant, as an antenna structure (e.g., the antenna structure 500 of FIG. 5A) disposed in an inner space of the housing, and a first wireless communication circuit (e.g., the wireless communication circuit 597 of FIG. 5A) disposed in the inner space and configured to at least one of transmit or receive a wireless signal in at least one first frequency band through the plurality of first antenna elements.

According to various embodiments, the second dielectric constant may be made of a material equal to or greater than the first dielectric constant.

According to various embodiments, the radiation characteristic of the antenna structure may be determined by the second dielectric constant.

According to various embodiments, the size of the antenna structure may be determined by the second dielectric constant.

According to various embodiments, the second dielectric constant may be greater than the first dielectric constant.

According to various embodiments, each of the plurality of first dielectrics may include at least one solder pad provided on an outer surface thereof, and each of the plurality of first dielectrics may be bonded to at least one conductive pad exposed on the first substrate surface of the substrate through a soldering process.

According to various embodiments, the at least one conductive pad may be arranged to at least partially overlap each of the plurality of first antenna elements when the first substrate surface is viewed from above.

According to various embodiments, the at least one conductive pad may be replaced with a partial area of each of the plurality of first antenna elements exposed on the first substrate surface.

According to various embodiments, the substrate may include a plurality of recesses provided in the first substrate surface to accommodate at least a portion of each of the plurality of first dielectrics.

According to various embodiments, the electronic device may further include at least one conductive member disposed on each of the plurality of first dielectrics, wherein the at least one conductive member may include a conductive dummy patch arranged to at least partially overlap each of the plurality of first antenna elements when the first substrate surface is viewed from above.

According to various embodiments, the electronic device may further include at least one conductive member disposed on each of the plurality of first dielectrics, wherein the at least one conductive member may include a conductive patch or a conductive pattern electrically connected to the first wireless communication circuit.

According to various embodiments, the at least one first frequency band may include a range of 25 GHz to 45 GHz.

According to various embodiments, the electronic device may further include a plurality of second antenna elements disposed near the plurality of first antenna elements when the first substrate surface is viewed from above, and a second wireless communication circuit disposed in the inner space and configured to at least one of transmit or receive a wireless signal in at least one second frequency band through the plurality of second antenna elements.

According to various embodiments, the electronic device may further include a plurality of third dielectrics disposed on the first substrate surface at a position corresponding to each of the plurality of second dielectrics when the first substrate surface is viewed from above, and configured to have a third dielectric constant.

According to various embodiments, the electronic device may further include a fourth dielectric disposed so as to be stacked with a thickness covering the plurality of third dielectrics on the first substrate surface, and configured to have a fourth dielectric constant.

According to various embodiments, at least two dielectric constants of the first dielectric constant, the second dielectric constant, the third dielectric constant, or the fourth dielectric constant may be the same as or different from each other.

According to various embodiments, the electronic device may further include a conductive layer configured to be stacked with a designated thickness on the first substrate surface without overlapping the plurality of first antenna elements and the plurality of second antenna elements, when the first substrate surface is viewed from above.

According to various embodiments, the conductive layer may be provided with a thickness that is not higher than the plurality of first dielectrics and/or the plurality of second dielectrics.

According to various embodiments, the electronic device may further include a support member disposed in the inner space and including recesses or through-holes arranged at a designated interval, wherein the antenna structure may be arranged in such a manner that at least some of the plurality of first dielectrics are at least partially accommodated in the recesses or the through-holes and the first substrate surface faces the support member.

According to various embodiments, the at least one second frequency band may include a range of 55 GHz to 70 GHz.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing at least partially comprising a support member including a plurality of recesses;
   an antenna structure disposed in an inner space of the housing, the antenna structure comprising:
      a substrate having a first substrate surface facing a first direction and a second substrate surface facing a second direction opposite the first direction, and being disposed so as to correspond to the support member, the substrate configured to have a first dielectric constant,
      a plurality of antenna elements disposed at the substrate and configured to form a directional beam in the first direction, and
      at least one dielectric disposed on the first substrate surface and configured to have a second dielectric constant, at least a portion of the at least one dielectric being disposed so as to be seated in at least one of the plurality of the recesses of the support member; and
   a wireless communication circuit disposed in the inner space and configured to at least one of transmit or receive a wireless signal in at least one frequency band through the plurality of antenna elements.

2. The electronic device of claim 1, wherein the second dielectric constant is greater than the first dielectric constant.

3. The electronic device of claim 1, wherein the at least one dielectric is disposed so as to entirely cover the first substrate surface.

4. The electronic device of claim 1, wherein the at least one dielectric is bonded to the first substrate surface through bonding or taping.

5. The electronic device of claim 1, wherein the wireless communication circuit is configured to at least one of transmit or receive the wireless signal in a frequency band in a range of 3 gigahertz (GHz) to 100 GHz through the plurality of antenna elements.

6. The electronic device of claim 1, wherein the at least the portion of the at least one dielectric seated in the at least one of the plurality of recesses is provided at a position corresponding to each of the plurality of antenna elements.

7. The electronic device of claim 1, wherein the support member is made of a non-conductive material.

8. The electronic device of claim 1,
   wherein the housing comprises a front plate facing in a third direction, a rear plate facing in a fourth direction that is opposite the third direction, and a side member configured to at least partially surround a space between the front plate and the rear plate and including a conductive member and a non-conductive member, and
   wherein the support member is disposed so as to be supported through the non-conductive member.

9. The electronic device of claim 8,
wherein at least a portion of the conductive member includes a plurality of through-holes, and
wherein each of the plurality of through-holes is disposed at a position corresponding to each of the plurality of antenna elements.

10. The electronic device of claim 8, wherein the directional beam is provided in the first direction toward which a side surface faces through at least a portion of the side member.

11. The electronic device of claim 8, further comprising:
a display disposed so as to be visible from an outside of the housing through at least a portion of the front plate in the inner space.

12. The electronic device of claim 1, further comprising:
at least one of a conductive patch or a conductive pattern disposed on the at least one dielectric and at least partially overlapping each of the plurality of antenna elements when the first substrate surface is viewed from above.

13. The electronic device of claim 12,
wherein the at least one dielectric comprises at least one solder pad provided on an outer surface, and
wherein the at least one dielectric is bonded to at least one conductive pad exposed on the first substrate surface through a soldering process.

14. The electronic device of claim 13,
wherein the wireless communication circuit is disposed on the second substrate surface, and
wherein at least one of the conductive patch or the conductive pattern is electrically connected to the wireless communication circuit through at least one of the at least one dielectric or at least one conductive via disposed on the substrate.

15. The electronic device of claim 1, further comprising:
a conducive dummy patch disposed on the at least one dielectric and at least partially overlapping each of the plurality of antenna elements when the first substrate surface is viewed from above.

16. The electronic device of claim 15, wherein the at least one dielectric is bonded to the first substrate surface through bonding or taping.

17. The electronic device of claim 1, wherein the plurality of antenna elements are disposed at regular intervals so as to form a linear array of antenna elements.

18. The electronic device of claim 1, wherein the support member is connected to, or integrated with, a lateral bezel of the housing.

19. The electronic device of claim 1, wherein the at least one dielectric is disposed at different locations on the first substrate surface with different thicknesses, and locations on the first substrate surface corresponding to the plurality of antenna elements have a same thickness of the at least one dielectric disposed thereon that is a greatest thickness of the at least one dielectric.

20. An electronic device comprising:
a housing at least partially comprising a support member including a plurality of recesses; and
an antenna structure disposed in an inner space of the housing, the antenna structure comprising:
a substrate having a first substrate surface facing a first direction and a second substrate surface facing a second direction opposite the first direction, the substrate configured to have a first dielectric constant;
a plurality of antenna elements disposed at the substrate;
at least one dielectric disposed on the first substrate surface and configured to have a second dielectric constant, at least a portion of the at least one dielectric being disposed so as to be seated in at least one of the plurality of the recesses of the support member; and
a wireless communication circuit disposed on the second substrate surface and configured to at least one of transmit or receive a wireless signal in at least one frequency band through the plurality of antenna elements.

21. The electronic device of claim 20, wherein the second dielectric constant is greater than the first dielectric constant.

* * * * *